(12) United States Patent
Noda et al.

(10) Patent No.: US 9,104,980 B2
(45) Date of Patent: Aug. 11, 2015

(54) INFORMATION PROCESSING DEVICE, INFORMATION PROCESSING METHOD, AND PROGRAM

(75) Inventors: Kuniaki Noda, Tokyo (JP); Takashi Hasuo, Tokyo (JP); Kenta Kawamoto, Tokyo (JP); Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 755 days.

(21) Appl. No.: 13/429,130

(22) Filed: Mar. 23, 2012

(65) Prior Publication Data

US 2012/0250981 A1 Oct. 4, 2012

(30) Foreign Application Priority Data

Mar. 31, 2011 (JP) ................................. 2011-077697

(51) Int. Cl.
*G06K 9/00* (2006.01)
*G06N 99/00* (2010.01)

(52) U.S. Cl.
CPC ..................................... *G06N 99/005* (2013.01)

(58) Field of Classification Search
USPC .......................................... 382/103, 155, 159
See application file for complete search history.

(56) References Cited

U.S. PATENT DOCUMENTS

| | | | | |
|---|---|---|---|---|
| 2009/0110236 A1* | 4/2009 | Huang et al. | ................... | 382/103 |
| 2011/0141251 A1* | 6/2011 | Marks et al. | ..................... | 348/61 |
| 2013/0243331 A1* | 9/2013 | Noda et al. | ..................... | 382/195 |
| 2014/0114888 A1* | 4/2014 | Noda et al. | ....................... | 706/12 |

FOREIGN PATENT DOCUMENTS

| | | |
|---|---|---|
| JP | 5-282275 | 10/1993 |
| JP | 7-29081 | 1/1995 |
| JP | 7-88791 | 4/1995 |
| JP | 2005-128959 | 5/2005 |

* cited by examiner

*Primary Examiner* — Wesley Tucker
(74) *Attorney, Agent, or Firm* — Sherr & Jiang, PLLC

(57) ABSTRACT

An information processing device includes a learning unit that performs, using an action performed by an object and an observation value of an image as learning data, learning of a separation learning model that includes a background model that is a model of the background of the image and one or more foreground model(s) that is a model of a foreground of the image, which can move on the background, in which the background model includes a background appearance model indicating the appearance of the background, and at least one among the one or more foreground model(s) includes a transition probability, with which a state corresponding to the position of the foreground on the background is transitioned by an action performed by the object corresponding to the foreground, for each action, and a foreground appearance model indicating the appearance of the foreground.

18 Claims, 19 Drawing Sheets

FIG. 2
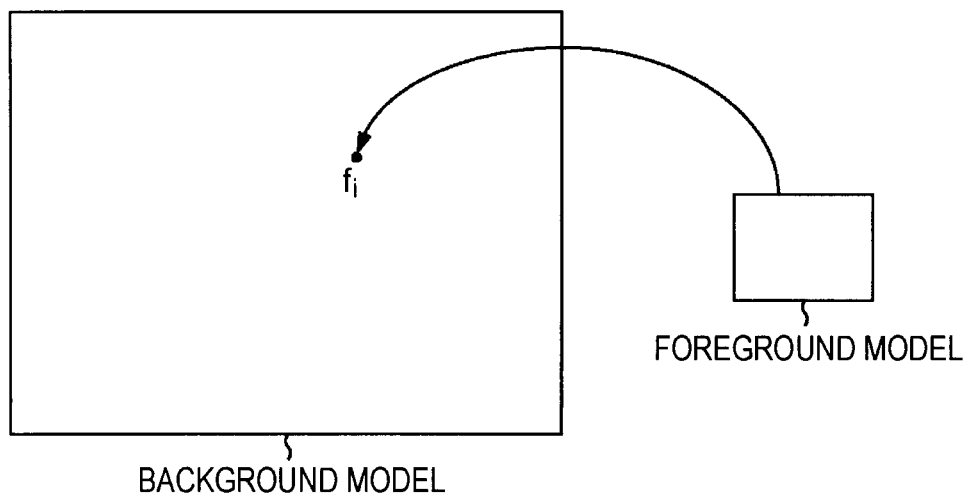
⇩
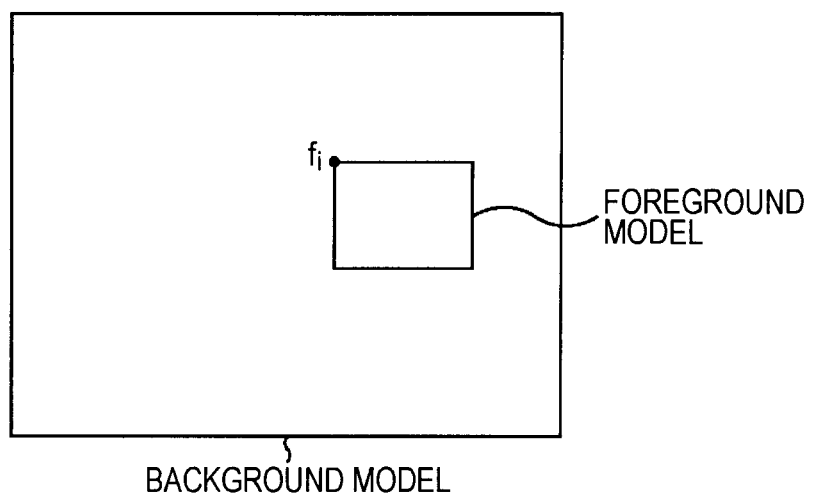

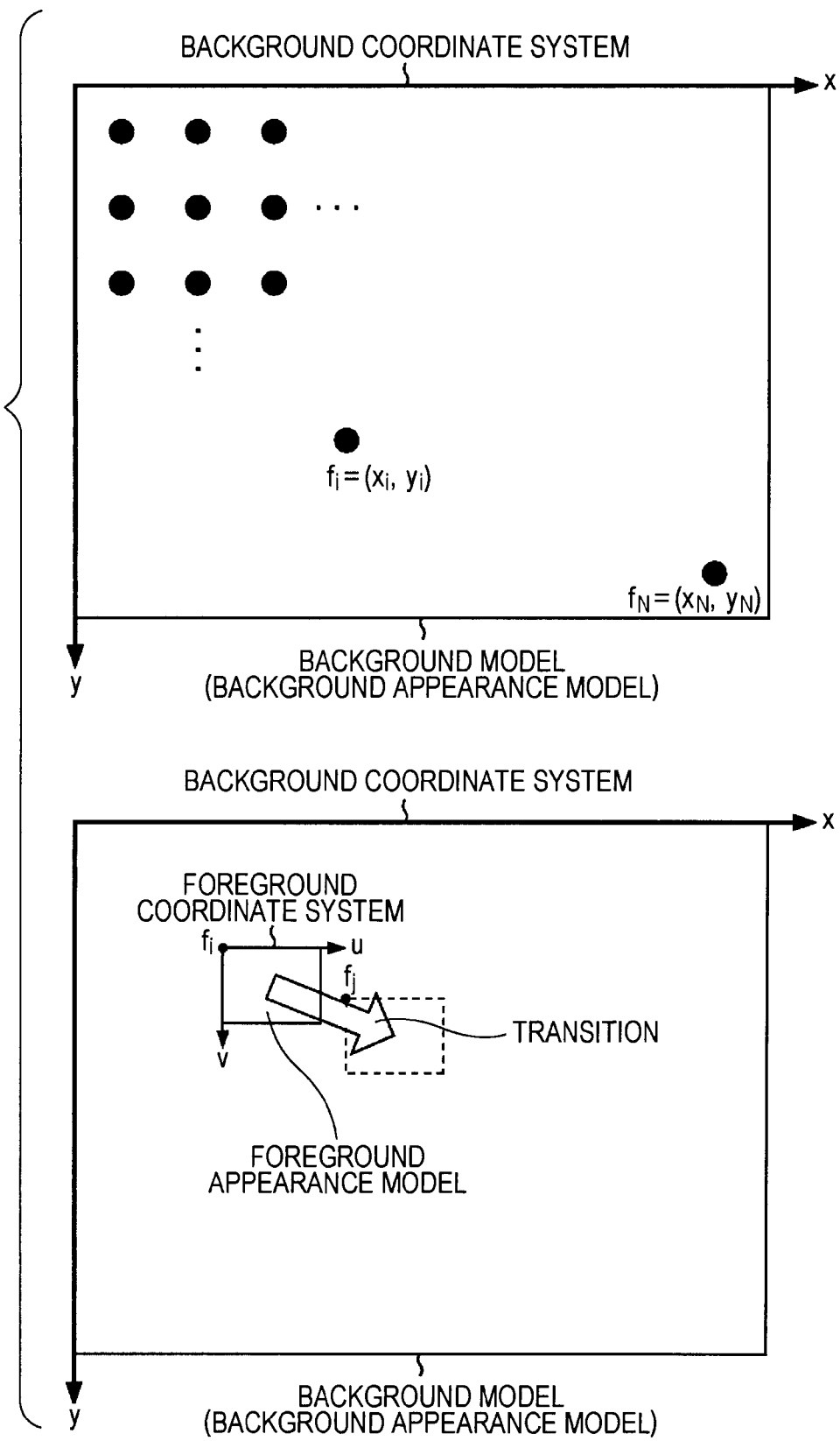

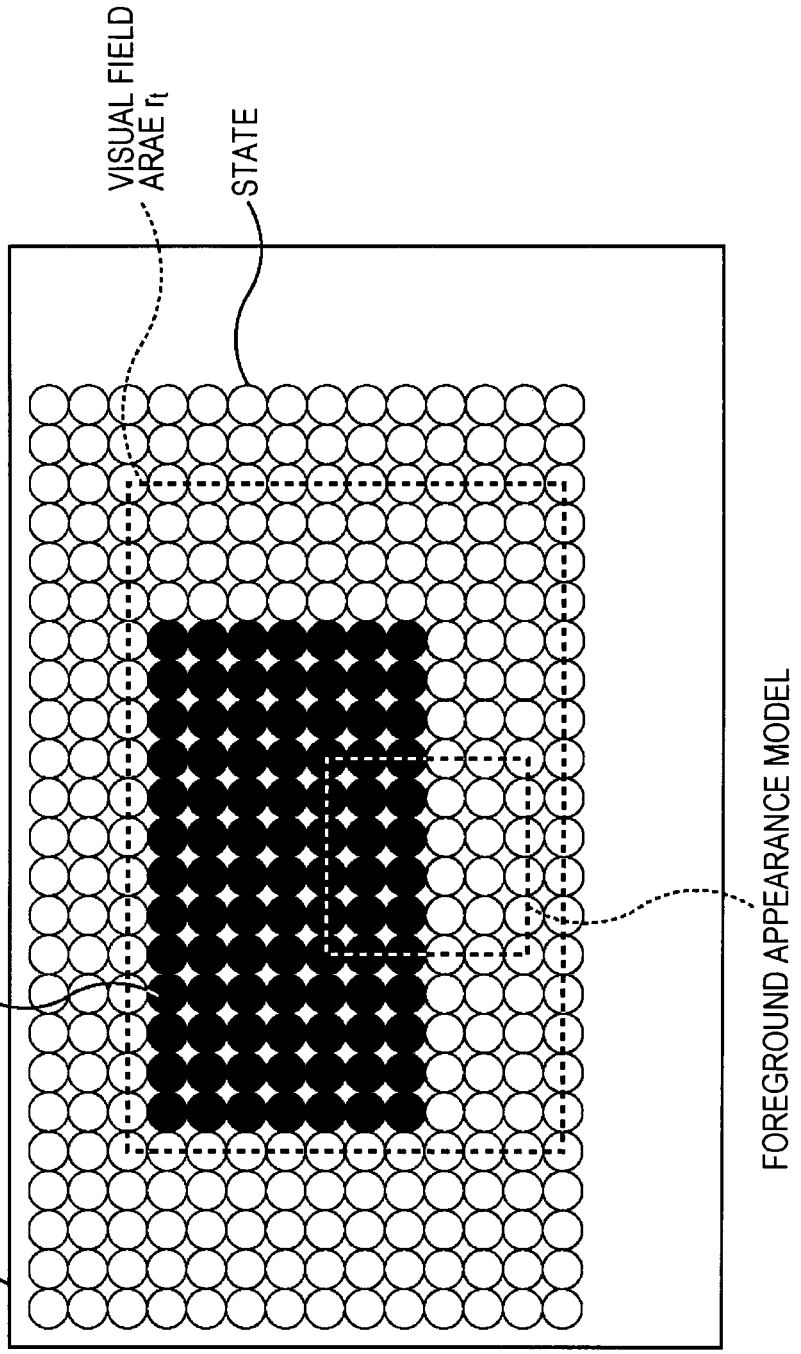

INFORMATION PROCESSING DEVICE, INFORMATION PROCESSING METHOD, AND PROGRAM

BACKGROUND

The present disclosure relates to an information processing device, an information processing method, and a program, and particularly to an information processing device, an information processing method, and a program that enables an agent, for example, a robot, or the like that can carry out an action to easily perform learning of an object in the environment where the action is taken.

In the related art, it is necessary to cut out an image area of a learning target (or a recognition target) in performing learning (or recognition) of an object in a certain environment using an image obtained by capturing the environment with a camera.

As a method of cutting out an image area of a learning target, there are an approach (Japanese Unexamined Patent Application Publication No. 7-88791) mainly using prior knowledge on the external appearance of the learning target, and an approach (Japanese Unexamined Patent Application Publication Nos. 5-282275, 7-29081, and 2005-128959) using motions of the target object.

In the approach using prior knowledge on the external appearance, marking for specifying an object or creation of a recognition model by performing learning of a learning target (target object) in advance is performed.

In the approach using motions of a target object, only an image area in which motions are made using an image difference, an optical flow, or the like is extracted.

However, in the extraction of the image area where motions are made, the background (of the image) has to stand still. Thus, when a camera for capturing images is mounted on a robot that can perform various actions, for example, if the background of an image captured by the camera falls in disorder due to the moving sight of the robot, it is difficult to appropriately cut out an area.

In addition, in an object operation task for operating an object by a robot, if the object as the operation target is to be discriminated from the hands (of the robot itself) for operating the object by the robot, it is necessary to mark labels for discriminating the respective object from hands and for the robot to identify the labels in the approach using prior knowledge on the external appearance, and it is necessary to recognize whether or not an image area cut out from an image captured by a camera is an image area of the object in the approach using motions of target object.

Furthermore, in the recognition whether or not the image area cut out from the image captured by the camera is an image area of the target object, it is necessary to designate the hands (to give knowledge about the hands) so as to cause a recognition device, which performs the recognition, to discriminate the hands from the object.

In addition, in the technique disclosed in Japanese Unexamined Patent Application Publication No. 2005-128959, a geometric model is created in advance, which shows, in an image captured by a camera, how the robot arms including the hand are taken, where the position of the fingertips (the hands) of the robot arms moves depending on what kind of command is output to the robot arms, or the like, and then an object operation is performed according to the geometric model.

In the technique disclosed in Japanese Unexamined Patent Application Publication No. 2005-128959, since the object operation is performed according to the geometric model as described above, it is necessary to manually modify the geometric model in every case where the relative positions of the camera and the robot arms change, a lens of the camera is replaced, the size of the robot arms is changed, or the like.

SUMMARY

When an agent such as a robot, or the like, that can carry out actions learns an object in the environment where the actions are performed, it is necessary to mark in order to specify the object or to extract an image area where motions are made, which is bothersome.

It is desirable for the present disclosure to enable an agent such as a robot, or the like, that can carry out actions to easily learn an object, or the like in the environment where the actions are performed.

According to an embodiment of the present disclosure, there are an information processing device including a learning unit that performs, using an action performed by an object and an observation value of an image as learning data, learning of a separation learning model that includes a background model that is a model of the background of the image and one or more foreground model(s) that is a model of a foreground of the image, which can move on the background, in which the background model includes a background appearance model indicating the appearance of the background, and at least one among the one or more foreground model(s) includes a transition probability, with which a state corresponding to the position of the foreground on the background is transitioned by an action performed by the object corresponding to the foreground, for each action, and a foreground appearance model indicating the appearance of the foreground, or a program that causes a computer to function as the information processing device.

According to another embodiment of the present disclosure, there is provided an information processing method including performing learning of a separation learning model using an action performed by an object and an observation value of an image as learning data, the separation learning model including a background model that is a model of the background of the image and one or more foreground model(s) that is a model of a foreground of the image, which can move on the background, in which the background model includes a background appearance model indicating the appearance of the background, and at least one among the one or more foreground model(s) includes a transition probability, with which a state corresponding to the position of the foreground on the background is transitioned by an action performed by the object corresponding to the foreground, for each action, and a foreground appearance model indicating the appearance of the foreground.

In the embodiments as described above, learning of the separation learning model including a background model that is a model of the background of an image and one or more foreground model(s) that is a model of a foreground of the image, which can move on the background, in which the background model includes a background appearance model indicating the appearance of the background, and at least one among the one or more foreground model(s) includes a transition probability, with which a state corresponding to the position of the foreground on the background is transitioned by an action performed by the object corresponding to the foreground, for each action, and a foreground appearance model indicating the appearance of the foreground is performed using the action performed by the object and the observation value of the image as learning data.

Furthermore, the information processing device may be an independent device, or an internal block constituting one device.

In addition, the program can be transmitted through a transmission medium, or provided by being recorded on a recording medium.

According to an embodiment of the present disclosure, learning of an object, or the like in an environment can be easily performed.

BRIEF DESCRIPTION OF THE DRAWINGS

FIG. 2 is a diagram schematically showing a separation learning model;

FIG. 3 is a diagram illustrating a position on a background and a state transition as a movement of a foreground model disposed on the background;

FIG. 5 is a diagram illustrating learning of the separation learning model when the visual field of an agent is limited;

DETAILED DESCRIPTION OF EMBODIMENTS

[Overview of the Present Disclosure]

Figure 1:
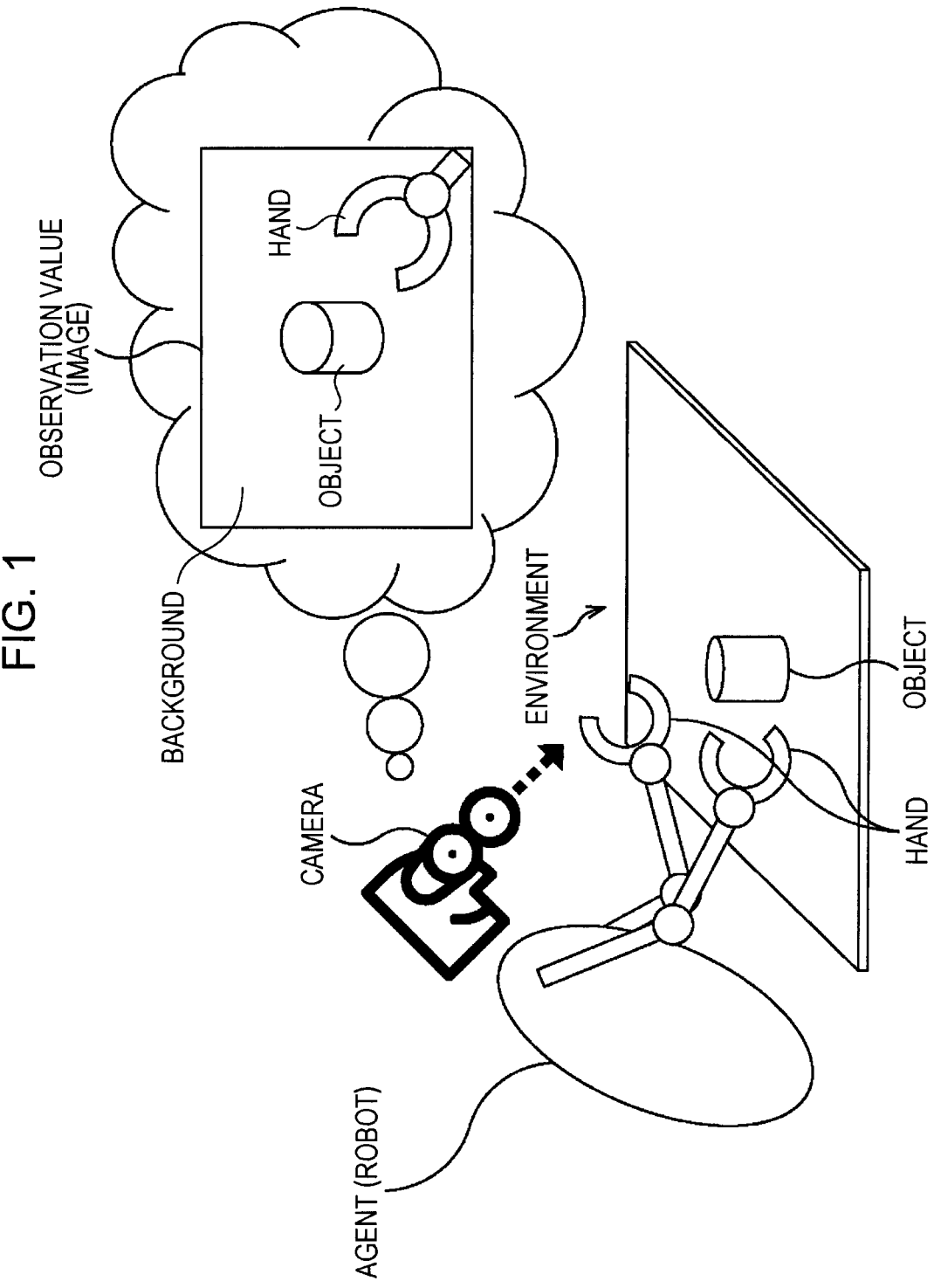
FIG. 1 is a diagram illustrating an overview of the present disclosure.

FIG. 1 is a diagram illustrating an overview of the present disclosure.

The present disclosure is a general-purpose framework that can be applied to a recognition algorithm for performing recognition of an environment, an object, and a body (hands) necessary for realizing an object operation under a physical environment by an agent such as a robot, or the like, capable of performing actions being equipped with hands as manipulators operating an object in the environment and a camera observing (capturing) the environment.

In the present disclosure, particularly, a model on an object in an environment (the external appearance of an object as an operation target or the way of making motions of the object under an environment), or a model on an agent itself (the way of making motions for an action by the body (hands) of the agent in the environment) is obtained in a self-organized manner from learning based on experience (sensory-motor pattern) acquired through interaction between the agent and the environment, without creating such a model in advance by a designer.

In the present disclosure, such experience of an object operation gained through interaction between the agent and the environment is perceived (acquired) through a camera mounted on the agent in a time-series manner of images (data).

In addition, in the present disclosure, learning is started from a state where explicit labels are not marked on the hands of the agent and the object and prior knowledge on the external appearance of the hands and the object is not given at all, and a model on the external appearance or motions of the hands and the object is learned from images in which the hands and the object makes motions (moves) together.

Furthermore, in the present disclosure, identification of the body (hands) of its own that can be controlled and identification of the object to be operated from among learned models are realized at the same time with learning of models.

For this reason, in the present disclosure, a framework for expressing the environment that encompasses the hands and the object as an operation target is prepared by separating a foreground model as a model on the external appearance and motions of the hands of the agent and the object as an operation target from a background model as a model of the environment where the object operation is conducted.

In other words, in the present disclosure, the entire environment that encompasses the hands and the object as an operation target is learned by a separation learning model.

The separation learning model includes a background model which is a model of the background of an image and one or more foreground model(s) which is a model of the foreground of the image that can be movable on the background. In regard to the separation learning model, the background as an environment and the foregrounds as the hands and the object to be operated are separately learned in such a way that the environment that serves as the background of an observed image is acquired in the background model, and the hands and the object to be operated that serve as the foreground of the observed image are acquired in the foreground model.

In the present technology, the separation learning model is learned in a self-organizing manner by estimating (re-estimating or updating) parameters of the separation learning model in accordance with Baum-Welch algorithm that is one of techniques of maximum likelihood estimation such as HMM, or the like, that is a probability model, using an observation series that is a series of observation values of an image acquired from the experience of the agent on the object operation.

Furthermore, as the observation series, for example, an image (moving image) captured by a camera, an image (moving image) obtained by capturing a picture of a computer game, or the like can be adopted.

[Chapter 1 Learning of Separation Learning Model]

FIG. 2 is a diagram schematically showing the separation learning model.

On the assumption that the observed image is constituted by the background corresponding to the environment and the foreground corresponding to the object and the like, the separation learning model is a model obtained by making the image into a model according to the formulation of, for example, the HMM that is a probability model, and includes a background model which is a model of the background of the image and one or more foreground model(s) that is a model of the foreground of the image.

In FIG. 2, the separation learning model includes a background model and a foreground model.

In the separation learning model, the observed image is expressed in such a way that the foreground indicated by the foreground model is disposed at a position $f_i$ on the background indicated by the background model.

FIG. 3 is a diagram illustrating the position $f_i$ on the background where the foreground is disposed and a state transition as a movement of the foreground model disposed in the background.

The background model has a background appearance model expressing the appearance of the background as a parameter.

Herein, as the background appearance model (eventually, the background model), for example, an image expressing the background, that is, a (rectangular) image template that is the appearance of the background can be employed.

The foreground model has a state $S_i$ of the HMM (as an internal variable) corresponding to the position $f_i$ on the background, and has, as parameters, a transition probability of the state transition from the state $S_i$ to a state $S_j$ and a foreground appearance model expressing the appearance of the foreground.

Herein, as the foreground appearance model, for example, an image expressing the foreground, that is, a (rectangular) image template that is the appearance of the foreground can be employed.

In addition, in regard to the background model (background appearance model), the position $f_i$ corresponding to the state $S_i$ is determined in advance.

In other words, if the number (total number) of states of the HMM is N at present, for example, N grid points disposed in a grid shape at equal intervals can be employed as the position $f_i$ corresponding to each of N states $S_i$ in the image template of the background as the background appearance model (background model) as shown in FIG. 3.

Herein, a two-dimensional coordinate system defined by the x axis in the horizontal direction and the y axis in the vertical direction is referred to as a background coordinate system with the origin set on the point in the upper left corner of (the rectangular image template of the background as) the background appearance model.

In addition, the coordinate of the position $f_i$ in the background coordinate system is indicated by $(x_i, y_i)$.

In the separation learning model, an image is observed in which the image template of the foreground as the foreground appearance model is disposed at the position $f_i$ on the image template of the background as the background appearance model so that, for example, a point in the upper left corner of the image template of the foreground is disposed so as to coincide with the position $f_i$ as shown in FIG. 3.

Herein, a two-dimensional coordinate system defined by the u axis in the horizontal direction and the v axis in the vertical direction is referred to as a foreground coordinate system with the origin set on the point in the upper left corner of (the image template of the foreground as) the foreground appearance model disposed on the position $f_i$ of the background appearance model, in other words, the position $f_i$.

Furthermore, the size of the foreground appearance model is determined in advance to, for example, the maximum size of the assumed foreground (hereinafter, also referred to as a foreground size). If the lateral length and the longitudinal length of the foreground size is indicated respectively by $u_{max}+1$ and $v_{max}+1$, the range where the image template of the foreground as the foreground appearance model exists in the foreground coordinate system is indicated by a formula $(0, 0) \leq (u, v) \leq (u_{max}, v_{max})$.

The state transition from the state $S_i$ to the state $S_j$ corresponds to the foreground appearance model disposed on the background appearance model having transition (movement) from the position $f_i$ corresponding to the state $S_i$ to the position $f_j$ corresponding to the state $S_j$, as shown in FIG. 3.

In the separation learning model, the background appearance model, the foreground appearance model, and (the state $S_i$ corresponding to) the position $f_i$ of the foreground appearance model on the background appearance model serve as parameters for defining an observation model generating observation values (of the image) observed in the separation learning model.

Furthermore, in the present embodiment, as an observation value of an image, for example, a binary black/white image or a grayscale image is employed.

However, by changing the framework of the observation model, it is possible to employ a color image as an observation value of an image.

In addition, in the present embodiment, the image template is employed as the foreground appearance model and the background appearance model, but as the foreground appearance model and the background appearance model, for example, partial feature quantities of the image, or the like can be employed, in addition to the image template.

[Clause 1.1 Separation Learning Model using HMM without Action Condition]

On the assumption that the observed image is constituted by the background corresponding to the environment and the foreground corresponding to the object and the like, the separation learning model is a model obtained by making the image into a model based on the formulation of the HMM, and can perform estimation of (model) parameters based on the Baum-Welch algorithm.

Herein, variables (parameters) used in the formulation of the HMM as the separation learning model is defined as follows.

T: length of an observation series
$O = \{o_1, o_2, \ldots, o_T\}$: observation series (the series of observation values of an image captured by a camera)
N: the number of states of the HMM
$S = \{1, 2, \ldots, N\}$ or $\{S_1, S_2, \ldots, S_N\}$: state set
$S_t$: state (number) at a time t
i, j: state number
$A = \{a_{ij} | a_{ij} = P(s_{t+1}=j | s_t=i)\}$: (state) transition probability
$\pi = \{\pi_i | \pi_i = P(s_0=i)\}$: initial state probability In addition, in the separation learning model, (parameters) of an observation model used in calculation of observation likelihood with which an observation value (of an image) is defined as follows.

$b_{world}$: background appearance model
$b_{fg}$: foreground appearance model
$F = \{f_1, f_2, \ldots, f_N\}$: distribution of (foreground (foreground appearance model $b_{fg}$) positions) on a background (background appearance model $b_{world}$)

As described above, in the present disclosure, the state i of the HMM corresponds to the position $f_i$ of the foreground on the background. Thus, if the state $i=\{1, 2, \ldots N\}$ is determined, the position of the foreground on the background is uniformly determined.

In addition, hereinbelow, the HMM as the separation learning model is indicated by $\lambda$ and the (model) parameters of the separation learning model $\lambda$ are indicated by $\lambda(\pi, A, b_{world}, b_{fg})$.

[(i) Calculation of Observation Likelihood]

A general discrete HMM has, as a parameter, an observation probability $B=\{b_i(v_g)\}$ that is a probability of observing a symbol $V=\{v_1, v_2, \ldots, v_Q\}$ that is a discrete observation value in a certain state i. In the general discrete HMM, an observation likelihood $p(o_t|s_t=i)=b/(o_t)$ of an observation value $o_t=v_g$ is calculated using the observation probability $B=\{b_i(v_g)\}$ on the assumption of being in a certain state i, and likelihood calculation based on a Forward-Backward algorithm is performed, thereby updating (re-estimating) the parameters.

On the other hand, the separation learning model includes, instead of an observation probability B of the symbol, an observation model defined by the universal background appearance model $b_{world}$ the foreground appearance model $b_{fg}$ moving on the background, and the distribution of the state i corresponding to the position $f_i$ of the foreground (foreground appearance model $b_{fg}$) on the background (background appearance model $b_{world}$).

Thus, in the present disclosure, when it is assumed that an image obtained by disposing the foreground appearance model $b_{fg}$ at the position $f_i$ corresponding to the state i is in the state ion the background appearance model $b_{world}$ using the background appearance model $b_{world}$ foreground appearance model $b_{fg}$, and the distribution of the state i as the observation model, an observation value (hereinafter, also referred to as a virtual observation value) observed in the separation learning model is generated as $o^{model}(i)$. Furthermore, in the present disclosure, an observation likelihood $p(o_t|s_t=i)$, which is the plausibility of observing an observation value $o_t$ in the state i in the separation learning model is obtained based on Formula (1) using the virtual observation value $o^{model}(i)$, and is used instead of the observation probability $b_i(o_t)$ of the general discrete HMM.

$$p(o_t | s_t = i) = \frac{1}{D}\exp\left(-\frac{g(o_t - o^{model}_{(i)})}{2\sigma^2}\right) \quad (1)$$

Herein, in Formula (1), the function $g(o_t-o^{model}(i))$ is a function for computing the distance of scalar values corresponding to the difference (error) $o_t-o^{model}(i)$ between the observation value (actual observation value) $o_t$ of an image and the virtual observation value $o^{model}(i)$ which are arguments.

In addition, in Formula (1), 6 and D are constants for determining the sharpness of a change in the observation likelihood $p(o_t|s_t=i)$ for the error that is the difference $o_t-o^{model}(i)$ between the observation value $o_t$ of an image and the virtual observation value $o^{model}(i)$, and are set in advance.

According to Formula (1), an image in which the foreground appearance model $b_{fg}$ is disposed at the position $f_i$ corresponding to the state i on the background appearance model $b_{world}$ is obtained as the observation value (virtual observation value) $o^{model}(i)$ observed in state i in the separation learning model.

In addition, a value corresponding to the difference $o_t-o^{model}(i)$ between the observation value $o_t$ of the image and the virtual observation value $o^{model}(i)$ is obtained as the observation likelihood $p(o_t|s_t=i)$ that the observation value $o_t$ of the image is observed in the state i.

[(ii) Forward-Backward Algorithm]

In regard to the separation learning model $\lambda$, it is possible to calculate a forward probability $\alpha_{t+1}(j)$ and a backward probability $\beta_{t+1}(i)$ based respectively on Formula (2) and Formula (3) in the Forward-Backward Algorithm using the observation likelihood $p(o_t|s_t=i)$ by obtaining the observation likelihood $p(o_t|s_t=i)$ based on Formula (1).

Herein, the forward probability $\alpha_{t+1}(j)$ denotes a probability of, in the separation learning model $\lambda$, observing observation series $o_1, o_2, \ldots, o_{t+1}$ and being in the state j at a time t+1. In addition, the backward probability $\beta_{t+1}(i)$ denotes a probability of, in the separation learning model $\lambda$, being in the state i at a time t and then observing observation series $o_{t+1}, o_{t+2}, \ldots, o_T$.

$$\alpha_0(j) = \pi_j \quad (2)$$
$$\alpha_{t+1}(j) = P(o_1, o_2, \ldots, o_{t+1}, s_{t+1} = j | \lambda) = \sum_{i=1}^{N} \alpha_t(i) a_{ij} p(o_{t+1} | s_{t+1} = j)$$

$$\beta_T(i) = 1 \quad (3)$$
$$\beta_t(i) = P(o_{t+1}, o_{t+2}, \ldots, o_T, s_t = i | \lambda) = \sum_{j=1}^{N} a_{ij} p(o_{t+1} | s_{t+1} = i) \beta_{t+1}(j)$$

According to Formula (2), an initial state probability $\pi_j$ of the state j is obtained as a forward probability $\alpha_0(j)$ at a time t=0 that is the initial value. Furthermore, according to Formula (2), a forward probability $\alpha_{t+1}(j)$ at a time t=1 and later times is obtained using a forward probability $\alpha_t(i)$ as a state probability of being in the state i at a time t. In other words, a probability of being in the state j by observing an observation value $o_{t+1}$ at a time t+1 from the state i at a time t is obtained as the forward probability $\alpha_{t+1}(j)$ at a time t=1 and later times.

In addition, according to Formula (3), a backward probability $\beta_T(i)$ at a time t=T that is the initial value is set to 1 in all states $S_i (1 \leq i \leq N)$, which indicates that a state probability of all states i at the time t=T is set to 1. Furthermore, according to Formula (3), a backward probability $\beta_t(i)$ at a time t=T-1 and preceding times is obtained using a backward probability $\beta_{t+1}(j)$ as a state probability of being in the state j at the time t+1. In other words, a probability of being in the states i at the time t when the observation value $o_{t+1}$ is observed at the time t+1 and in the state j is obtained as the backward probability $\beta_t(i)$ at the time t=T-1 and the preceding times.

Herein, $a_{ij}$ in both Formulas (2) and (3) denotes a (state) transition probability of transiting from the state i to a state j.

Furthermore, the forward probability $\alpha_t(i)$ as a posterior probability in the Forward-Backward algorithm (and the backward probability $\beta_t(i)$) indicates a probability of being in the state i at the time t when the observing observation series $o_1, o_2, \ldots, o_T$ are observed in the separation learning model $\lambda$, but obtaining the forward probability $\alpha_t(i)$ as a posterior probability is equivalent to performing state recognition when the observation series $o_1, o_2, \ldots, o_T$ are observed.

Therefore, it is possible to estimate the position $f_i$ of the foreground on the background by obtaining the forward probability $\alpha_t(i)$ as a posterior probability after learning of the separation learning model $\lambda$ advances to a certain extent.

[(iii) Baum-Welch Algorithm]

The parameters $\lambda(\pi, A, b_{world}, b_{fg})$ of the separation learning model $\lambda$ using the HMM can be estimated (re-estimated or updated) in accordance with the Baum-Welch algorithm based on, for example, an EM (Expectation-Maximization) algorithm.

According to the Baum-Welch algorithm, in the separation learning model $\lambda$, when the observation series $O=\{o_1, o_2, \ldots, o_T\}$ are observed, a probability $\xi_t(i, j)$ of transiting (states) from the state i at the time t−1 to the state j at the time t can be obtained according to Formula (4).

$$\xi_t(i,j) = P(s_{t-1} = i, s_t = j \mid O, \lambda) = \frac{\alpha_{t-1}(i)a_{ij}p(o_t \mid s_t = j)\beta_t(j)}{P(O \mid \lambda)} \quad (4)$$

$$(1 \le t \le T)$$

In addition, in the separation learning model $\lambda$, when the observation series $O=\{o_1, o_2, \ldots, o_T\}$ is observed, a probability $\gamma_{t-1}(i)$ of being in the state i at the time t−1 can be calculated, for the probability $\xi_t(i, j)$, as a probability marginalized for the state j at the time t according to Formula (5).

$$\gamma_{t-1}(i) = P(s_{t-1} = i \mid O, \lambda) = \sum_{j=1}^{N} \xi_t(i,j) \quad (5)$$

$$(1 \le t \le T)$$

In the Baum-Welch algorithm, the parameters $\lambda(\pi, A, b_{world}, b_{fg})$ are re-estimated using the probability $\xi_t(i, j)$ of Formula (4) and the probability $\gamma_{t-1}(i)$ of Formula (5).

Herein, a separation learning model after re-estimation is indicated by $\lambda'$, and parameters thereof are indicated by $\lambda'(\pi', A', b'_{world}, b'_{fg})$.

The parameters $\lambda'(\pi', A', b'_{world}, b'_{fg})$ after re-estimation can be obtained according to Formulas (6), (7), (8), and (9).

In other words, an initial state probability $\pi'_i$ after updating can be obtained according to Formula (6).

$$\pi'_i = \frac{\alpha_1(i)\beta_1(i)}{P(O \mid \lambda)} \quad (6)$$

A transition probability after updating can be obtained according to Formula (7).

$$a'_{ij} = \frac{\sum_{t=1}^{T} \xi_t(i,j)}{\sum_{t=1}^{T} \gamma_{t-1}(i)} = \frac{\sum_{t=1}^{T} \alpha_{t-1}(i)a_{ij}p(o_t \mid s_t = j)\beta_t(j)}{\sum_{t=1}^{T} \sum_{j=1}^{N} \alpha_{t-1}(i)a_{ij}p(o_t \mid s_t = j)\beta_t(j)} \quad (7)$$

$$= \frac{\sum_{t=1}^{T} \alpha_{t-1}(i)a_{ij}p(o_t \mid s_t = j)\beta_t(j)}{\sum_{t=1}^{T} \alpha_{t-1}(i)\beta_{t-1}(i)}$$

Herein, the numerator of Formula (7) denotes an expectation value of the number of transitions from the state i to the state j, and the denominator denotes an expectation value of the number of transitions from the state i.

A foreground appearance model $b'_{fg}$ after updating can be obtained according to Formula (8).

$$b'_{fg}(u,v) = \frac{\sum_{t=1}^{T} \sum_{j=1}^{N} \alpha_t(j)\beta_t(j)o_t(x_j + u, y_j + v)}{\sum_{t=1}^{T} \sum_{j=1}^{N} \alpha_t(j)\beta_t(j)} \quad (8)$$

Herein, the (u, v) of Formula (8) denotes a position (coordinate) on the foreground coordinate system (FIG. 3), and is a variable taking a value within the size of the foreground described in FIG. 3, that is, a variable within the scope (of integers) indicated by formula $(0, 0) \le (u, v) \le u_{max}, v_{max})$.

In addition, $b'_{fg}(u, v)$ of Formula (8) denotes a pixel value of a position (u, v) on the foreground coordinate system (in FIG. 3) of an image template as the foreground appearance model.

Furthermore, $o_t(x_j+u, y_j+v)$ indicates a pixel value of a position $(x_j+u, y_j+v)$ on the background coordinate system of an image as an observation value $o_t$ at the time t, that is, (a pixel value of) an area in a foreground size at a position $f_j=(x_j, y_j)$ on the background coordinate system in the image as the observation value $o_t$ at the time t.

Thus, according to Formula (8), the foreground appearance model $b'_{fg}$ after updating is obtained using the area in the foreground size at the position $(x_j, y_j)$ corresponding to the state j in the image as the observation value $o_t$ at the time t.

Furthermore, the numerator of Formula (8) is the sum of all states at all times of a weighted value (multiplied value) obtained as a result by cutting out, from the observation value $o_t$ at the time t, an observation value (image) $o_t(x_j+u, y_j+v)$ of the area in the foreground size at the position $(x_j, y_j)$ corresponding to the state j, and weighting (multiplying) a probability $\alpha_t(j)\beta_t(j)$ of being in the state j at the time t to the image $o_t(x_j+u, y_j+v)$, and indicates an expectation value of the observation value (image) $o_t(x_j+u, y_j+v)$ observed in the area $(x_j+u, y_j+v)$ in the foreground size.

In addition, the denominator of Formula (8) indicates an expectation value of the number of (state) transitions for all states at all times.

The background appearance model $b'_{world}$ after updating can be obtained according to Formula (9).

$$b'_{world} = \frac{\sum_{t=1}^{T} \sum_{j=1}^{N} \alpha_t(j)\beta_t(j)o_t^{world}(x, y)}{\sum_{t=1}^{T} \sum_{j=1}^{N} \alpha_t(j)\beta_t(j)} \quad (9)$$

$$o_t^{world}(x, y) = \begin{cases} 0 & \text{if } x_j \le x \le x_j + u_{max}, y_j \le y \le y_j + v_{max} \\ o_t(x, y) & \text{else} \end{cases}$$

In Formula (9), (x, y) indicates a position (coordinate) on the background coordinate system. $o_t^{world}(x, y)$ is indicates an observation value $o_t$ at the time t in which (an observation value of) an area $o_t(x_j+u, y_j+v)$ in the foreground size at a position $(x_j, y_j)$ corresponding to the state j is set to 0, that is, an image in which a pixel value of the area of the foreground is set to 0 in the image as the observation value $o_t$ at the time t.

Therefore, the numerator of Formula (9) is the sum of all states at all times of a weighted value (multiplied value) obtained as a result by weighting (multiplying) a probability $\alpha_t(j)\beta_t(j)$ of being in the state j at the time t by an image as the observation value $o_t^{world}(x, y)$ at the time t obtained by setting an observation value (pixel value) $o_t(x_j+u, y_j+v)$ of the area in the foreground size at the position $(x_j, y_j)$ corresponding to the state j to 0, and indicates an expectation value of a universal image regardless of movement (transition) of the foreground, that is an image observed as the background.

In addition, as the denominator of Formula (8), the denominator of Formula (9) indicates an expectation value of the number of (state) transitions for all state at all times.

As described above, in updating the foreground appearance model $b_{fg}$, the observation value $o_t(x_j+u, y_j+v)$ of the area in the foreground size at the position $(x_j, y_j)$ corresponding to the state j is used among observation values $o_t$ of an image, and in updating background appearance model $b_{world}$ an observation value $o_t^{world}(x, y)$ of an image obtained by setting the observation value of an area in the foreground size at the position corresponding to the state j to 0 is used. Then, the background and the foreground moving on the background are separated and learned in a self-organizing manner, and as a result, it is possible to easily learn the background and the foreground moving on the background without marking in order to specify the object or extracting an image area that makes motions (moves).

[(iv) Initial Value of Parameter]

In learning of the separation learning model as the initial values of the parameters $\lambda(\pi, A, b_{world}, b_{fg})$, for example, random values in the range of 0 to 1 are set.

However, in the present disclosure, in regard to a transition probability $a_{ij}$, for example, an initial value set with periphery restriction for restricting the movement of the foreground that moves on the background to a peripheral position from the current position is set based on Formula (10).

$$a_{ij} = \begin{cases} rand[0, 1] & \text{if } d_{ij} < d_{min} \\ 0 & \text{else} \end{cases} \quad (10)$$

Herein, in Formula (10), rand[0, 1] indicates a random value in the range of 0 to 1.

In addition, in Formula (10), $d_{ij}$ indicates the distance between the position $f_i$ on the background corresponding to the state i and the position $f_j$ on the background corresponding to the state j, and $d_{min}$ indicates a threshold value of a constant defining the periphery.

In the background coordinate system, when the movement of the foreground is restricted to transition of a position to four peripheries from the current position when the (lateral and longitudinal) distance between the positions corresponding the state is 1, for example, the threshold $d_{min}$ is set to a value in the range indicated by Formula $1 \leq d_{min} < \sqrt{2}$. In addition, when the movement of the foreground is restricted to transition of a position to eight peripheries from the current position, the threshold $d_{min}$ is set to a value in the range indicated by Formula $\sqrt{2} \leq d_{min} < 2$.

[Clause 1.2 Separation Learning Model using HMM on Condition of State Transition by Action (HMM with Action Condition)]

In the HMM using the above-described separation learning model, a transition probability $a_{ij}$ is a ratio of the number of transitions to a state j to the sum of transitions from a state i, and simply (without a particular condition) indicates a probability of transition between states.

In the present disclosure, the expression of the HMM is expanded, and an HMM having a transition probability $a_{ij}(w)$ on condition of an action w causing transition of a state (hereinafter, also referred to as an HMM with an action condition) is dealt with, and hereinbelow, a separation learning model using such (a transition probability) of an HMM with an action condition will be described.

Herein, an HMM having a transition probability $a_{ij}$ that is irrelevant to an action w or without the condition of an action w is also referred to as an HMM without an action condition, in order to differentiate from the HMM with an action condition.

In the HMM with an action condition, in regard to a transition probability, the dimension of an action is added to the dimension of the state i as a transition source to the state j as a transition destination by having a table of a transition probability from the state i and the state j for each action.

In other words, the transition probability $a_{ij}$ of the HMM without an action condition is two-dimensionally expressed by the dimension of the state i as a transition source and the state j as a transition destination, but the transition probability $a_{ij}(w)$ of the HMM with an action condition is three-dimensionally expressed by the dimension of the state i as a transition source, the state j as a transition destination, and an action.

Furthermore, the HMM with an action condition uses the following variables in addition to the variables used in the HMM without an action condition.

$U = \{u_0, u_1, \ldots, u_{T-1}\}$: action series (time-series of actions)

$w = \{w_1, w_2, \ldots, w_K\}$: action set (a set of actions that an object (the hands of an agent that can perform actions) corresponding to a foreground can perform)

Figure 4B:
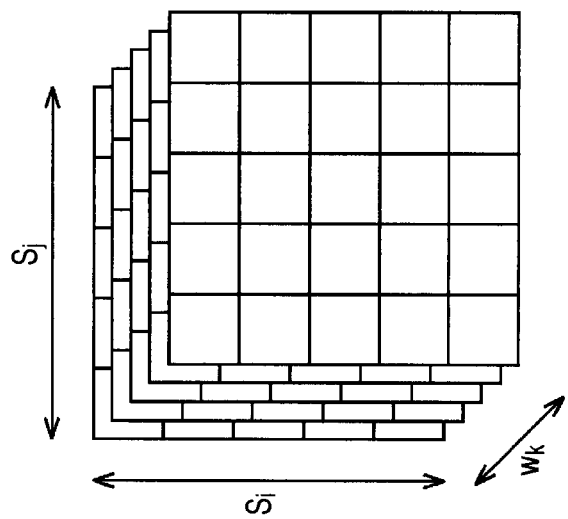
FIGS. 4A and 4B are diagrams showing a transition probability $A=a_{ij}$ of HMM without an action condition and a transition probability $A=a_{ij}(w_k)$ of HMM with an action condition.
Figure 4A:
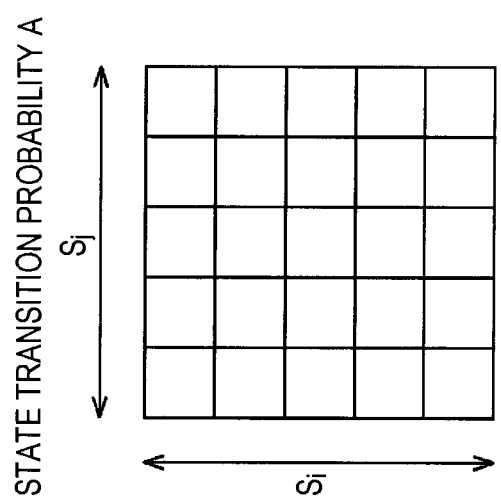

FIGS. 4A and 4B are diagrams showing a transition probability $A = a_{ij}$ of the HMM without an action condition and a transition probability $A = a_{ij}(w_k)$ of the HMM with an action condition.

As described above, the transition probability $a_{ij}$ of the HMM without an action condition is two-dimensionally expressed by the dimension of the state i as a transition source and the state j as a transition destination, and the transition probability $a_{ij}(w_k)$ of the HMM with an action condition is three-dimensionally expressed by the dimension of the state i as a transition source, the state j as a transition destination, and an action $w_k$.

The transition probability $a_{ij}(w_k)$ of the HMM with an action condition is a probability of transiting from the state i to the state j when the action $w_k$ is made, and a transition probability for each action $w_k$.

In the separation learning model using the HMM with an action condition, a foreground model includes the transition probability $a_{ij}(w_k)$ for each action $w_k$, instead of the transition probability $a_{ij}$ that is irrelevant to the action w.

[(i) Forward-Backward Algorithm]

In regard to the separation learning model $\lambda$ using the HMM with an action condition, the forward probability $\alpha_{t+1}(j)$ in the Forward-Backward algorithm is a probability of observing the observation series $o_1, o_2, \ldots, o_t$ and of being in the state j at the time t+1 in the separation learning model $\lambda$ accompanied by the performance of an action of the action series $u_1, u_2, \ldots, u_t$, and can be obtained according to Formula (11).

$$\alpha_0(j) = \pi_j \quad (11)$$
$$\alpha_{t+1}(j) = P(o_1, o_2, \ldots, o_{t+1}, u_1, u_2, \ldots, u_t, s_{t+1} = j | \lambda) =$$
$$\sum_{i=1}^{N} \alpha_t(i) a_{ij}(u_t) p(o_{t+1} | s_{t+1} = j)$$

According to Formula (11), an initial state probability $\pi_j$ of the state j is obtained as a forward probability $\alpha_0(j)$ at a time t=0 that is the initial value. Furthermore, according to Formula (11), a forward probability $\alpha_{t+1}(j)$ at a time t=1 and later times is obtained using a forward probability $\alpha_t(i)$ as a state probability of being in the state i at a time t. In other words, a probability of being in the state j by observing an observation value $o_{t+1}$ at a time t+1 is obtained in the state i at the time t as the forward probability $\alpha_{t+1}(i)$ at a time t=1 and later times by a state transition occurring by performance of an action $u_t$.

In regard to the separation learning model $\lambda$ using the HMM with an action condition, the backward probability $\beta_t(i)$ in the Forward-Backward algorithm is a probability of being in the state i at the time t and then of observing the observation series $o_{t+1}$, $o_t+2$, $o_T$ and in the separation learning model $\lambda$ accompanied by the performance of an action of the action series $u_{t+1}, u_{t+2}, \ldots u_{T-1}$, and can be obtained according to Formula (12).

$$\beta_T(i) = 1 \quad (12)$$

$$\beta_t(i) = P(o_{t+1}, o_{t+2}, \ldots, o_T, u_{t+1}, u_{t+2}, \ldots, u_{T-1}, s_t = i \mid \lambda) = \sum_{j=1}^{N} \alpha_{ij}(u_t)p(o_{t+1} \mid s_{t+1} = i)\beta_{t+1}(j)$$

According to Formula (12), a backward probability $\beta_T(i)$ at a time t+T that is the initial value is set to 1 with respect to all states i ($1 \leq i \leq N$), but this indicates that a state probability of all states i at a time t=T is set to 1. Furthermore, according to Formula (12), a backward probability $\beta_t(i)$ at a time t=T−1 and preceding times is obtained using the backward probability $\beta_{t+1}(j)$ as a state probability of being in the state j at a time t+1. In other words, if it is assumed to observe an observation value $o_{t+1}$ at the time t+1 and be in the state j by state transition occurring due to performance of an action $u_t$ and being in the state i at the time t, the probability of being in the state i at the time t is obtained as the backward probability $\beta_t(i)$ at a time t=T−1 and the preceding times.

[(ii) Baum-Welch Algorithm]

The parameters $\lambda(\pi, A, b_{world}, b_{fg})$ of the separation learning model $\lambda$ using the HMM with an action condition can be estimated (re-estimated or updated) by expanding the Baum-Welch algorithm for obtaining the parameters $\lambda(\pi, A, b_{world}, b_{fg})$ of the separation learning model $\lambda$ using the HMM without an action condition for an action $w_k$.

In other words, in the separation learning model $\lambda$, accompanied by performing an action of the action series $U=\{u_0, u_1, \ldots, u_{T-1}\}$, when the observation series $O=\{o_1, o_2, \ldots, o_T\}$ is observed, a probability $\xi_t(i, j, w_k)$ of transiting from the state i at the time t−1 to the state j at the time t by performing the action $w_k$ in the state i at the time t−1 can be obtained according to Formula (13).

$$\xi_t(i, j, w_k) = P(s_{t-1} = i, s_t = j, u_{t-1} = w_k \mid O, U, \lambda) = \quad (13)$$

$$\frac{\alpha_{t-1}(i)a_{ij}(w_k)p(o_t \mid s_t = j)\beta_t(j)}{P(O, U \mid \lambda)}$$

$$(1 \leq t \leq T)$$

In addition, in the separation learning model $\lambda$, accompanied by performing an action of the action series $U=\{u_0, u_1, \ldots, U_{T-1}\}$, when the observation series $O=\{o_1, o_2, \ldots, o_T\}$ is observed, a probability $\gamma_{t-1}(i, w_k)$ of performing an action $u_{t-1}=w_k$ in the state i at the time t−1 can be obtained according to Formula (14) as a probability marginalized for the state j at the time t in the probability $\xi_t(i, j, w_k)$.

$$\gamma_{t-1}(i, w_k) = P(s_{t-1} = i, u_{t-1} = w_k \mid O, U, \lambda) = \sum_{j=1}^{N} \xi_t(i, j, w_k) \quad (14)$$

$$(1 \leq t \leq T)$$

The parameters $\lambda(\pi, A, b_{world}, b_{fg})$ of the separation learning model $\lambda$ using the HMM with an action condition can be estimated using the probability $\xi_t(i, j, w_k)$ of Formula (13) and the probability $\gamma_{t-1}(i, w_k)$ of Formula (14).

In other words, the initial state probability $\pi'_i$ after updating can be obtained according to Formula (15).

$$\pi'_i = \frac{\alpha_0(i)\beta_0(i)}{P(O, U \mid \lambda)} \quad (15)$$

A transition probability $a'_{ij}(w_k)$ after updating can be obtained according to Formula (16).

$$a'_{ij}(w_k) = \frac{\sum_{t=1}^{T} \xi_t(i, j, w_k)}{\sum_{t=1}^{T} \gamma_{t-1}(i, w_k)} = \frac{\sum_{t=1}^{T} \alpha_{t-1}(i)a_{ij}(w_k)p(o_t \mid s_t = j)\beta_t(j)}{\sum_{t=1}^{T} \sum_{j=1}^{N} \alpha_{t-1}(i)a_{ij}(w_k)p(o_t \mid s_t = j)\beta_t(j)} \quad (16)$$

$$= \frac{\sum_{t=1}^{T} \alpha_{t-1}(i)a_{ij}(w_k)p(o_t \mid s_t = j)\beta_t(j)}{\sum_{t=1}^{T} \alpha_{t-1}(i)\beta_{t-1}(i)}$$

Herein, the numerator of Formula (16) indicates an expectation value of the number of transition to the state j by performing the action $w_k$ in the state i, and the denominator indicates an expectation value of the number of performing the action $w_k$ and the state transition in the state i.

Furthermore, the foreground appearance model $b'_{fg}$ after updating can be obtained according to Formula (8) in the same manner as the HMM without an action condition, and the background appearance model $b'_{world}$ after updating also can be obtained according to Formula (9) in the same manner as the HMM without an action condition.

[Clause 1.3 Expansion to Incremental learning of Baum-Welch Algorithm]

In Clause 1.1 and Clause 1.2, formulation is performed for learning according to the Baum-Welch algorithm when all learning data (observation series and the action series) used in learning of the separation learning model is obtained at once, that is, batch learning, but a Baum-Welch algorithm can be expanded to incremental learning.

Herein, incremental learning is learning for obtaining the same result as in learning all learning data at once in such a way that, since only a partial section of the entire learning data can be observed in one round of learning (updating parameters), learning data is learned for a plurality of times, and (model) parameters are gradually updated leaving past learning results, and finally all learning data is learned.

The expansion to incremental learning of the Baum-Welch algorithm can be realized by retaining and calculating accumulated numerators and denominators of each updating computation as an intermediate result of the updating computation for obtaining the transition probability $a'_{ij}$ of Formula (7), the foreground appearance model $b'_{fg}(b'_{fg}(u, v)$ of Formula (8), the background appearance model $b'_{world}$ of Formula (9), and the transition probability $a'_{ij}(w_k)$ of Formula (16).

For example, when incremental learning is performed in which learning data having T steps (samples) as a whole is used by T/C steps for one time and learning of the separation learning model is performed for C times, Formulas (7) to (9), and Formulas (17), (18), (19), and (20) are respectively used, instead of Formula (16).

$$a'_{ij} = \frac{a_{ij}^{n(new)}}{a_{ij}^{d(new)}} = \frac{a_{ij}^n + \sum_{t=1}^{T/C} \alpha_{t-1}(i) a_{ij} p(o_t | s_t = j) \beta_t(j)}{a_{ij}^d + \sum_{t=1}^{T/C} \alpha_{t-1}(i) \beta_{t-1}(i)} \quad (17)$$

$$b'_{fg}(u, v) = \frac{b_{fg}^{n(new)}}{b^{d(new)}} = \frac{b_{fg}^n + \sum_{t=1}^{T/C} \sum_{j=1}^{N} \alpha_t(j) \beta_t(j) o_t(x_j + u, y_j + v)}{b^d + \sum_{t=1}^{T/C} \sum_{j=1}^{N} \alpha_t(j) \beta_t(j)} \quad (18)$$

$$b'_{world} = \frac{b_{world}^{n(new)}}{b^{d(new)}} = \frac{b_{world}^n + \sum_{t=1}^{T/C} \sum_{j=1}^{N} \alpha_t(j) \beta_t(j) o_t^{world}(x, y)}{b^d + \sum_{t=1}^{T/C} \sum_{j=1}^{N} \alpha_t(j) \beta_t(j)} \quad (19)$$

$$a'_{ij}(w_k) = \frac{a_{ij}^{n(new)}(w_k)}{a_{ij}^{d(new)}(w_k)} = \frac{a_{ij}^n(w_k) + \sum_{t=1}^{T/C} \alpha_{t-1}(i) a_{ij}(w_k) p(o_t | s_t = j) \beta_t(j)}{a_{ij}^d(w_k) + \sum_{t=1}^{T/C} \alpha_{t-1}(i) \beta_{t-1}(i)} \quad (20)$$

Herein, in Formula (17), $a_{ij}^{n(new)}$ of the numerator and $a_{ij}^{d(new)}$ of the denominator are the intermediate results of the updating computation of Formula (17), the intermediate results of $a_{ij}^{d(new)}$ and $a_{ij}^{n(new)}$ are retained in the incremental learning, in the next updating computation, the intermediate results of $a_{ij}^{d(new)}$ and $a_{ij}^{n(new)}$ are respectively used as $d_{ij}^d$ and $a_{ij}^n$ of Formula (17).

In Formula (18), $b_{fg}^{n(new)}$ of the numerator and $b^{d(new)}$ of the denominator are the intermediate results of the updating computation of Formula (18), the intermediate results of $b^{d(new)}$ and $b_{fg}^{n(new)}$ are retained in the incremental learning, in the next updating computation, the intermediate results of $b^{d(new)}$ and $b_{fg}^{n(new)}$ are respectively used as $b^d$ and $b_{fg}^n$ of Formula (18).

In Formula (19), $b_{world}^{n(new)}$ of the numerator and $b^{d(new)}$ of the denominator are the intermediate results of the updating computation of Formula (19), the intermediate results of $b^{d(new)}$ and $b_{world}^{n(new)}$ are retained in the incremental learning, in the next updating computation, the intermediate results of $b^{d(new)}$ and $b_{world}^{n(new)}$ are respectively used as $b^d$ and $b_{world}^n$ of Formula (19).

Since the intermediate result $b^{d(new)}$ that is the denominator of Formula (18) and Formula (19) is the same, the intermediates result $b^{d(new)}$ that is the denominator of Formula (18) and Formula (19) may retain either intermediate result.

In Formula (20), $a_{ij}^{n(new)}(w_k)$ of the numerator and $a_{ij}^{d(new)}(w_k)$ of the denominator are the intermediate results of the updating computation of Formula (20), the intermediate results of $a_{ij}^{d(new)}(w_k)$ and $\alpha_{ij}^{n(new)}(w_k)$ are retained in the incremental learning, in the next updating computation, the intermediate results of $a_{ij}^{d(new)}(w_k)$ and $a_{ij}^{n(new)}(W_k)$ are respectively used as $a_{ij}^{d(new)}$ and $a_{ij}^{n(new)}$ of Formula (20).

As described above, the intermediate results of the updating computation is stored, and the intermediate results of the updating computation and the next learning data are used to perform updating computation to update the parameters of the separation learning model, whereby it is possible to perform incremental learning of the separation learning model.

In other words, every time new learning data is input, it is possible to reflect updated content of new learning data to the parameters of the separation learning model by accumulating an updating amount on the denominators and numerators, which are variables, as parameters of the separation learning model while maintaining the learning results of the past.

[Chapter 2 Learning of Separation Learning Model when Visual Field is Limited]

FIG. 5 is a diagram illustrating learning of the separation learning model when the visual field of an agent is limited.

In Chapter 1, it was tacit assumption that the whole image of the background in which the foreground is disposed can be observed, but when an image captured by a camera mounted on an agent is used as an observation value $o_t$, there is a case where only a part of area of the background in which the foreground is disposed is obtained as the observation value $o_t$.

In other words, it is assumed that the agent has a visual field, the agent observes only the image of an area of the visual field (visual field area) thereof as the observation value $o_t$ in the entire image of the background in which the foreground is disposed.

Furthermore, the visual field area is changed in such a way that the agent makes motions of the head to move the direction of sight.

However, the visual field area $R = \{r_1, r_2, \ldots, r_T\}$ per time t is given as known data.

In this case, it is possible to learn the separation learning model by updating the parameters only targeting a state $S_t \in r_t$ corresponding to the position $f_i$ of the foreground in a case where the foreground is completely included in the visual field area.

FIG. 5 shows the appearance in which only the image of a known visual field area $r_t$ is observed as the observation value $o_t$ at a time t on the background (background appearance model) in which the foreground (foreground appearance model) is disposed.

In FIG. 5, circles indicate the state i corresponding to the position $f_i$ at which the foreground is disposed, in addition, black circles among the circles indicate the state corresponding to the position $f_i$ at which the entire area in the foreground size is included in the visual field area $r_t$.

As shown in FIG. 5, in the background (background appearance model) on which the foreground (foreground appearance model) is disposed, when only the image of the known visual field area $r_t$ is observed as the observation value $o_t$ at the time t, updating of a transition probability is performed only targeting a transition probability from the state i (indicated by the black circles in FIG. 5) corresponding to the position $f_i$ at which the entire area in the foreground size is included in the visual field area $r_t$, among transition probabilities from all states.

In addition, updating of the foreground appearance model and the background appearance model is performed only using a forward probability $\alpha_t(i)$ and a backward probability $\beta_t(i)$ for the state i (indicated by the black circles in FIG. 5) corresponding to the position $f_i$ at which the entire area in the foreground size is included in the visual field area $r_t$, among forward probabilities and backward probabilities as posterior probabilities for all states.

[Chapter 3 Learning of Separation Learning Model Having a Plurality of Foreground Models]

Figure 6:
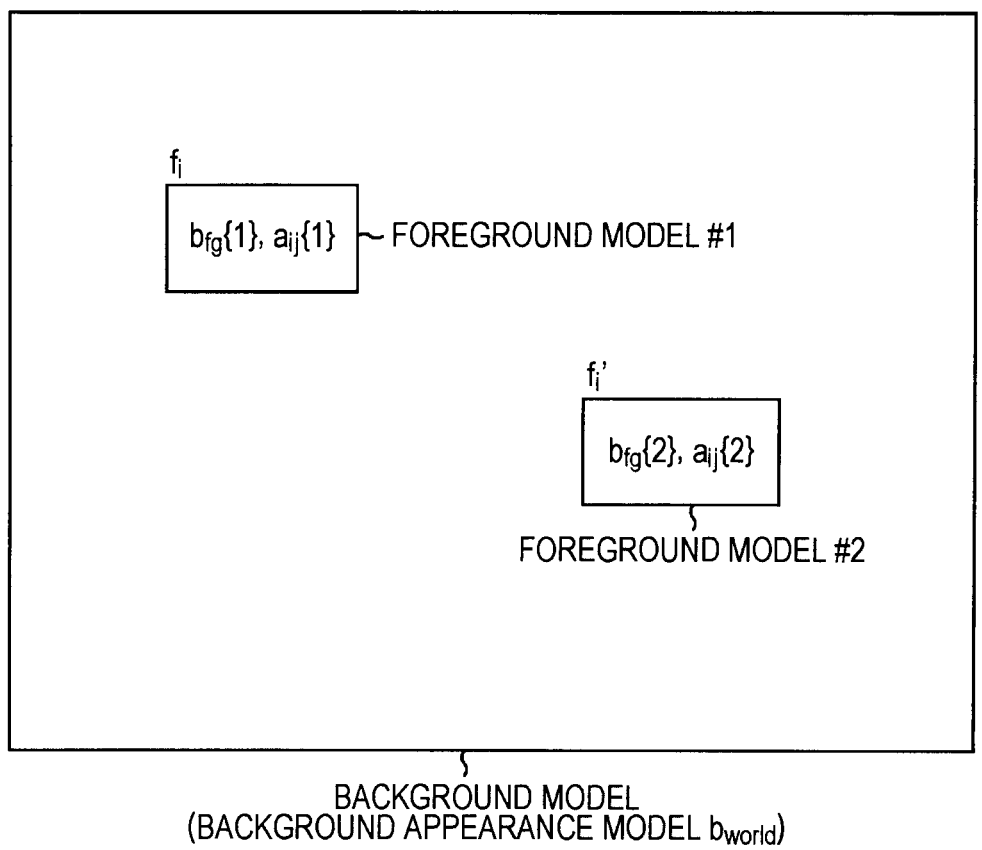
FIG. 6 is a diagram schematically showing another separation learning model.

FIG. 6 is a diagram schematically showing another separation learning model.

The separation learning model can include a plurality of foreground models.

In FIG. 6, the separation learning model includes a background model and two foreground models #1 and #2. In this case, in the separation learning model, an observed image is expressed in such a way that a foreground indicated by the foreground model #1 is disposed at the position $f_i$ on the background indicated by the background model, and a foreground indicated by the foreground model #2 is disposed at the position Herein, a transition probability $a_{ij}$ (or $a_{ij}(w_k)$) and a foreground appearance model $b_{fg}$ of an m-th foreground model #m when the separation learning model has M foreground models #1 to #M, which is plural, are respectively indicated by $a_{ij}\{m\}$ and $b_{fg}\{m\}$.

In the separation learning model having the plural M foreground models #1 to #M, the M foreground models #1 to #M share one (background appearance model $b_{world}$) background model.

Furthermore, the number M of the foregrounds included in the observed image is set to be known, and the separation learning model is set to have foreground models having M (or higher number) of foregrounds that are known.

In addition, the transition probability $a_{ij}\{m\}$ of the foreground model #m that the separation learning model has may be a transition probability $a_{ij}$ of the HMM without an action condition, or a transition probability $a_{ij}(w_k)$ of the HMM with an action condition.

Herein, a foreground model having the transition probability $a_{ij}(w_k)$ of the HMM with an action condition is also referred to as a foreground model with an action condition, and a foreground model having the transition probability $a_{ij}$ of the HMM without an action condition is also referred to as a foreground model without an action condition.

The plurality of foreground models that the separation learning model has may include the foreground model with an action condition and the foreground model without an action condition together.

[Clause 3.1 Calculation of Observation Likelihood]

When an observation likelihood $p(o_t|s_t=i)$ of observing an observation value (of an image) is to be calculated in the separation learning model when the separation learning model has the plurality of foreground models, a virtual observation value $o^{model}(i)$ of Formula (1) is generated by considering all combinations in which all of the foreground expressed by the plurality of foreground models that the separation learning model has are disposed on the background and all of the foreground expressed by the plurality of foreground models that the separation learning model has are disposed at the position $f_i$ on the background corresponding to each state i.

However, in this case, an amount of calculation of the observation likelihood $p(o_t|s_t=i)$ exponentially increases with respect to the number of the foreground models that the separation learning model has.

Thus, in this present disclosure, when the separation learning model has a plurality of foreground models, it is possible to approximately obtain the observation likelihood $p(o_t|s_t=i)$.

In other words, in the present disclosure, it is possible to individually dispose (the foregrounds expressed by) the plurality of foreground models on (the backgrounds expressed by) the background model, and to obtain the observation likelihood $p(o_t|s_t=i)$ for an individual foreground model according to Formula (1).

In this case, the forward probability $\alpha_t(i)$ and the backward probability $\beta_t(i)$ as state probabilities (posterior probabilities) are individually obtained for each foreground model #m.

Herein, the forward probability $\alpha_t(i)$ and the backward probability $\beta_t(i)$ for the foreground model #m are respectively expressed by $a_t\{m\}(i)$ (or $a_t\{m\}$) and $\beta_t\{m\}(i)$ (or $\beta_t\{m\}$).

If the foreground model #m is the foreground model without an action condition, the forward probability $\alpha_t\{m\}(i)$ and the backward probability $\beta_t\{m\}(i)$ for the foreground model #m are respectively obtained according to Formulas (2) and (3) using the observation likelihood $p(o_t|s_t=i)$ for the foreground model #m.

In addition, if the foreground model #m is the foreground model with an action condition, the forward probability $\alpha_t\{m\}(i)$ and the backward probability $\beta_t\{m\}(i)$ for the foreground model #m are respectively obtained according to Formulas (11) and (12) using the observation likelihood $p(o_t|s_t=i)$ for the foreground model #m.

[Clause 3.2 Baum-Welch Algorithm]

Estimation (re-estimation or updating) of the parameters $\lambda(\pi, A, b_{world}, b_{fg})$ of the separation learning model $\lambda$ that has the plurality of the foreground models based on the Baum-Welch algorithm can be performed as follows.

In other words, if an initial state probability, a transition probability, and the foreground appearance model of the foreground model #m are respectively indicated by $\pi_i\{m\}$, $a_{ij}\{m\}$, and $b_{fg}\{m\}$, and when the foreground model #m is a foreground model without an action condition, the initial state probability $\pi_i\{m\}$, the transition probability $a_{ij}\{m\}$, and the foreground appearance model $b_{fg}\{m\}$ of the foreground model #m use the observation likelihood $p(o_t|s_t=i)$, the forward probability $\alpha_t\{m\}(i)$, and the backward probability $\beta_t\{m\}(i)$ for the foreground model #m if necessary, and are respectively updated according to Formulas (6) to (8).

In addition, when the foreground model #m is a foreground model with an action condition, the initial state probability $\pi_i\{m\}$, the transition probability $a_{ij}\{m\}$, and the foreground appearance model $b_{fg}\{m\}$ of the foreground model #m use the observation likelihood $p(o_t|s_t=i)$, the forward probability $\alpha_t\{m\}(1)$, and the backward probability $\beta_t\{m\}(i)$ for the foreground model #m if necessary, and are respectively updated according to Formulas (15), (16), and (8).

Furthermore, when incremental learning is to be performed, the initial state probability $\pi_i\{m\}$, the transition probability $a_{ij}\{m\}$, and the foreground appearance model $b_{fg}\{m\}$ of the foreground model #m use the observation likelihood $p(o_t|s_t=i)$, the forward probability $\alpha_t\{m\}(i)$, and the backward probability $\beta_t\{m\}(i)$ for the foreground model #m if necessary, and are respectively updated according to Formulas (17) (or Formula (20)), and (18).

The background appearance model $b_{world}$ uses the forward probability $\alpha_t\{m\}(i)$, and the backward probability $\beta_t\{m\}(i)$ for each foreground model #m, and is updated according to Formula (21).

$$b'_{world} = \frac{\sum_{m=1}^{M} \sum_{t=1}^{T} \sum_{i=1}^{N} \alpha_t\{m\}(i)\beta_t\{m\}(i)o_t^{world}\{m\}}{\sum_{m=1}^{M} \sum_{t=1}^{T} \sum_{i=1}^{N} \alpha_t\{m\}(i)\beta_t\{m\}(i)} \quad (21)$$

Furthermore, when the incremental learning is performed, the background appearance model $b_{world}$ is updated according to Formula (22).

$$b'_{world} = \frac{b_{world}^{n(new)}}{b^{d(new)}} = \frac{b_{world}^{n} + \sum_{m=1}^{M}\sum_{t=1}^{T}\sum_{i=1}^{N} \alpha_t\{m\}(i)\beta_t\{m\}(i)o_t^{world}\{m\}}{b^d + \sum_{m=1}^{M}\sum_{t=1}^{T}\sum_{i=1}^{N} \alpha_t\{m\}(i)\beta_t\{m\}(i)} \quad (22)$$

Herein, in Formulas (21) and (22), $o_t^{world}\{m\}$ indicates an image of which a pixel value of a foreground area indicated by the foreground model #m is set to 0 among observation values $o_t$ at the time t obtained by setting (an observation value of) an area in the foreground size at the position $f_i$ of the m-th foreground model #m to 0, that is, observation values $o_t$ at the time t.

Therefore, according to Formulas (21) and (22), the background appearance model $b_{world}$ is up dated by combining knowledge on the entire M foreground models #1 to #M.

[Chapter 4 Exclusive Learning of Foreground Model]

When the separation learning model λ has the plurality of foreground models, learning of the separation learning model λ, that is, updating of the parameters λ(π, A, $b_{world}$, $b_{fg}$) can be performed by the method described in Chapter 3.

However, since there is no restriction on the corresponding relationship between the plurality of foregrounds in the observation series of an image and the foreground models in the method described in Chapter 3, there can be a case where the same foreground in the observation series of the image is overlapped and learned (made into a model) by two or more foreground models among the plurality of foreground models that the separation learning model has or is not learned even by any foreground model.

Thus, in the present disclosure, when the separation learning model λ has the plurality of foreground models, it is possible to introduce an exclusive restriction process to updating of (the initial state probability, the transition probability, and the foreground appearance model that are parameters of) the foreground model.

In the exclusive restriction process, learning is restricted so that the foreground that is learned in a certain foreground model is not learned in another foreground model.

The exclusive restriction process can be realized by putting orders of priority on updating of the foreground models and by a reduction process.

In putting orders of priority on updating of the foreground models, orders of priority are put on the foreground models for performing updating of parameters, and according to the orders of priority, a foreground model is selected as a target model to be learned (for updating the parameters).

In the reduction process, an observation value by an amount used in updating of the foreground appearance model of the target model is reduced from the observation series of an image as learning data used in learning of the target model. Then, updating of the next target model is performed using an observation value of an image after the reduction process.

Figure 7:
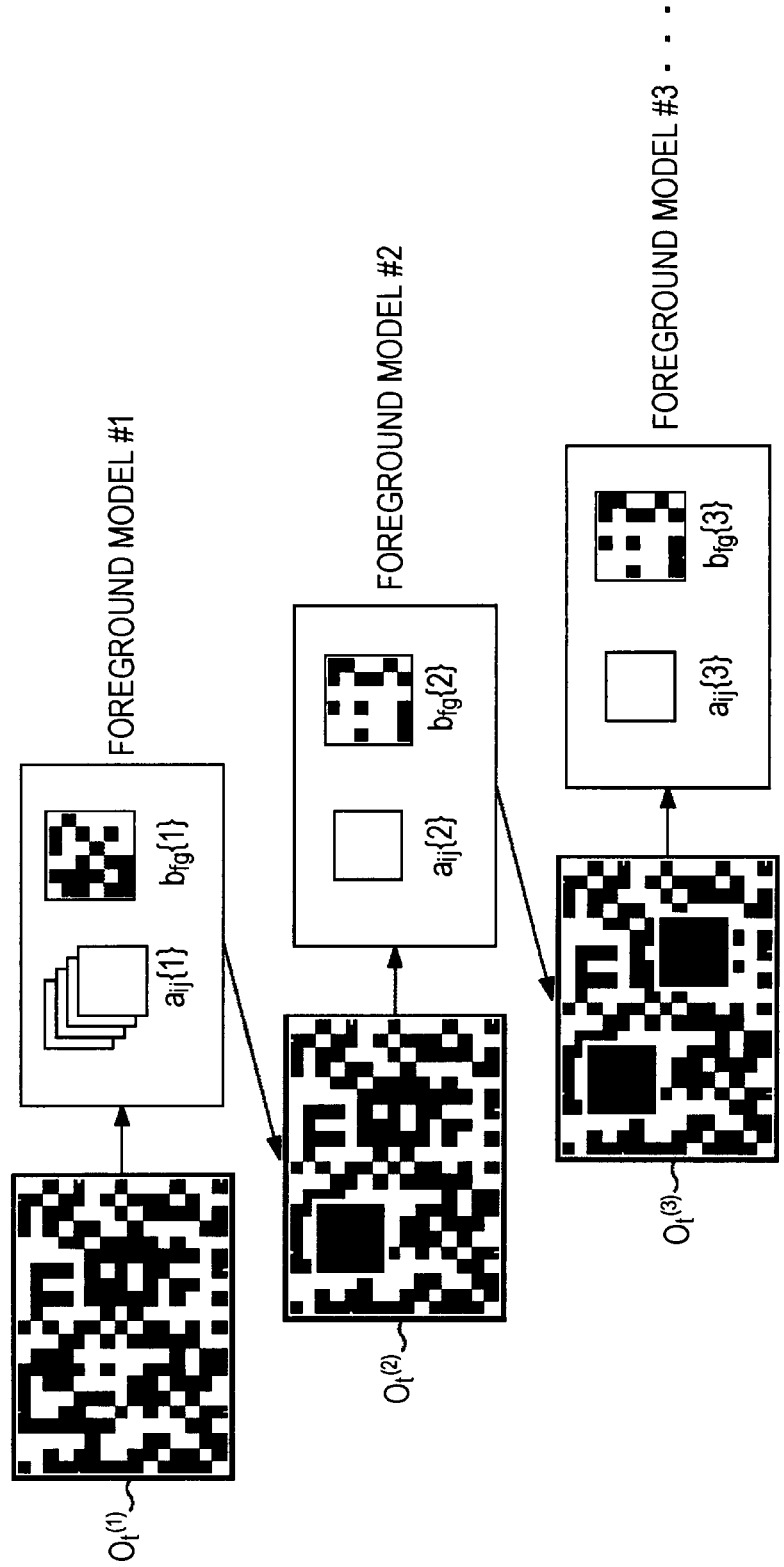
FIG. 7 is a diagram illustrating an exclusive restriction process.

FIG. 7 is a diagram illustrating the exclusive restriction process.

Now, the order of priority of the m-th foreground model #m out of M foreground models #1 to #m that the separation learning model A has set to be in m-th order.

In addition, the observation value of an image at a time t used in learning (updating of the parameters) of the m-th foreground model #m is indicated by $o_t^{(m)}$.

In the exclusive restriction process, as described above, the reduction process is performed in which an observation value by an amount used in updating of the foreground appearance model of the target model is reduced from the observation series of an image as learning data used in learning of the target model, and updating of the next target model is performed using an observation value of an image after the reduction process.

The reduction process is performed according to Formula (23).

$$o_t^{(m+1)} = o_t^{(m)} - \sum_{i=1}^{N} \alpha_t(i)\beta_t(i)o_t^{(m)}(x_i + u, y_i + v) \quad (23)$$

$$0 \leq u \leq u_{max}, 0 \leq v \leq v_{max}$$

Herein, the observation value $o_t^{\{1\}}$ at the time t used in learning of the foreground model #1 of which the order of priority is the first is equal to the observation value $o_t$ of an image at the time t.

In Formula (23), by weighting (or multiplying) a probability $\alpha_t(i)\beta_t(i)$ ($\alpha_t\{m\}(i)\beta_t\{m\}(i)$) of being in the state i at the time t to an observation value $o_t^{(m)}(x_i+u, y_i+v)$ used in learning of the m-th foreground model #m within a (rectangular) area in the foreground size at a position ($x_i$, $y_i$) corresponding to the state i, the sum $\Sigma\alpha_t(i)\beta_t(i)o_t^{(m)}(x_i+u, y_i+v)$ of the weighted value (multiplied value) (of the weighted image) obtained from the result thereof is obtained for all states.

Then, by subtracting the sum $\Sigma\alpha_t(i)\beta_t(i)o_t^{(m)}(x_i+u, y_i+v)$ from the observation value $o_t^{(m)}(x_i+u, y_i+v)$, an observation value $o_t^{(m+1)}$ at the time t used in learning of a foreground model #(m+1) that has the next order of priority is obtained.

Furthermore, $o_t$ of the first term and $\Sigma\alpha_t(i)\beta_t(i)o_t^{(m)}(x_i+u, y+v)$ of the second term in the right side of Formula (23) form a matrix of the same size, that is, a two-dimensional variable, and the result of $\alpha_t(i)\beta_t(i)o_t^{(m)}(x_i+u, y_i+v)$ when the sum (Σ) of the second terms is taken is attained for an index (a1, a2) that is a two-dimensional variable V(a1, a2) within a range of formula ($x_i$, $y_1$)(a1, a2)($x_i$+u, $y_i$+v) among two-dimensional variables V(a1, a2) in the same size as $o_t$.

According to the exclusive restriction process, since the observation value obtained by deducting information on the foreground learned by the foreground model with high order of priority is used in learning of the foreground model with low order of priority, it is possible to prevent the foreground model with low order of priority from learning the foreground learned by the foreground model with high order of priority, in other words, to prevent leaning of the same foreground by the plurality of foreground models.

[Chapter 5 Self-Organizing Correspondence of Foreground and Foreground Model of Separation Learning Model having Foreground Model with Action Condition and Foreground Model without Action Condition]

[Clause 5.1 Separation Learning Model having Foreground Model with Action Condition and Foreground Model without Action Condition]

Learning of a separation learning model will be described when the separation learning model has both foreground model with an action condition and foreground model without an action condition as a plurality of foreground models.

According to the separation learning model having both foreground model with an action condition and foreground model without an action condition, it is possible to learn an environment in which there are a plurality of foregrounds on the background, and which includes foregrounds whose moving is associated with a known action (hereinafter, also referred to as foregrounds with an action) and foregrounds whose association between movements and actions are unknown, but whose movements can be observed (hereinafter, also referred to as foregrounds without actions) as the plurality of foregrounds using observation series observed from the environment.

Herein, on the background, the environment in which (one or more) foregrounds with an action and (one or more) foregrounds without an action exit together corresponds to, for example, an environment where an object operation is performed, or the like, in such a way that, as shown in FIG. 1, the agent uses an image captured by the camera mounted on its own body and manipulators that are hands of the agent.

In this case, in the observation series of the image perceived in the visual field of the agent (or the image captured by the camera), a foreground that is the image of the object to be operated and a foreground that is the image of the hands of the agent's own operating the object are mixed.

In addition, since movements of the hands in the visual field of the agent are made by actions output from the agent itself, the foreground corresponding to the hands of the agent is a foreground with an action that moves according to a known action.

On the other hand, since movements of the object to be operated are made by contact of the hands of the agent to the object, but it is unknown with what action the movements are caused, the foreground corresponding to the object to be operated is a foreground without an action.

Furthermore, when the separation learning model learns the observation series observed from the environment where the foreground with an action and the foreground without an action as described above are mixed, the separation learning model has foreground models with an action condition of which the number is equal to (or greater than) the number of foregrounds with an action and foreground models without an action condition of which the number is equal to (or greater than) the number of foregrounds without an action.

Figure 8:
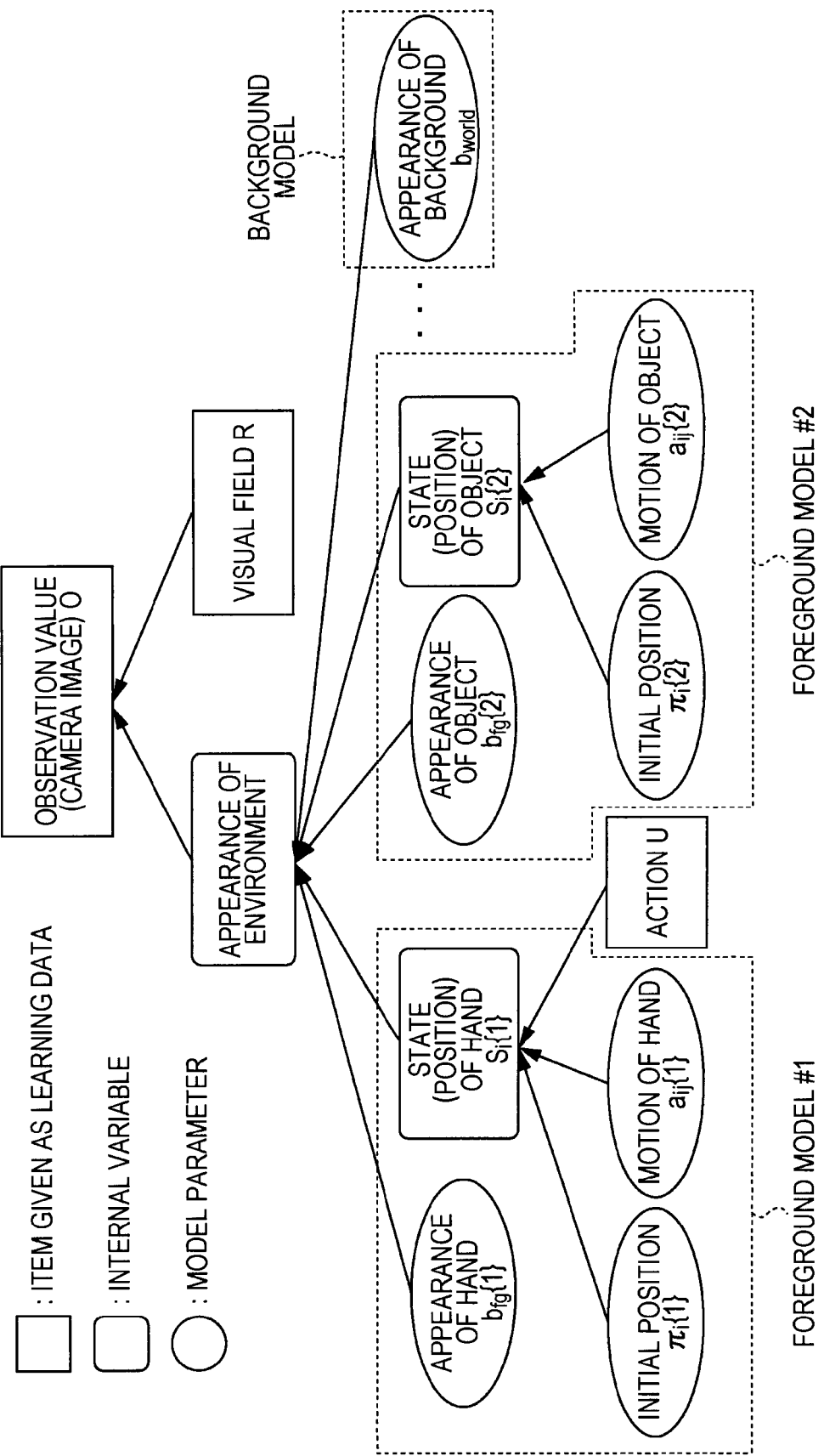
FIG. 8 is a diagram showing a graphical model as a generation model for generating an image of an environment where one or more foregrounds with an action and one or more foregrounds without an action are mixed on the background.

FIG. 8 is a diagram showing a graphical model as a generation model for generating observation values of an image obtained by capturing by camera the environment where one or more foregrounds with an action and one or more foregrounds without an action are mixed on the background.

In other words, FIG. 8 shows, when an environment is assumed where the hands of the agent corresponding to the foreground with an action and the object to be operated as the foreground without an action are mixed in the background, a graphical model of the assumed environment.

In the background, the assumed environment where the hands of the agent corresponding to the foreground with an action and the object to be operated as the foreground without an action are mixed can be expressed by the separation learning model having, as a plurality of foreground models, a foreground model #1 with an action condition that is a foreground model corresponding to the hands of the agent and a foreground model #2 without an action condition that is a foreground model corresponding to the object to be operated.

In other words, an image of the hands of the agent corresponding to the foreground with an action can be generated with the appearance of the hands, a state (position) of the hands, the initial position, and a motion (movement) of the hands.

In the foreground model #1 with an action condition, the appearance of the hands corresponds to a foreground appearance model $b_{fg}\{1\}$, the state (position) of the hands corresponds to a state $S_i\{1\}$ as an internal variable of the foreground model #1 (a position $f_i$ of the foreground appearance model $b_{fg}\{1\}$ on the background), the initial position corresponds to an initial state probability $\pi_i\{1\}$, and the motion of the hands corresponds to a transition probability $a_{ij}\{1\}$ of the HMM with an action condition, respectively.

Furthermore, the hands are driven by a driving signal for driving the hands, but the driving signal corresponds to an action series (time-series of an action) U, and the state (position) of the hands, in other words, the state $S_i\{1\}$ of the foreground model #1 is transitioned (moves) in accordance with the action series U.

An image of the object to be operated corresponding to the foreground without an action can be generated with the appearance of the object, a state (position) of the object, the initial position, and a motion (movement) of the object.

In the foreground model #2 without an action condition, the appearance of the object corresponds to a foreground appearance model $b_{fg}\{2\}$, the state (position) of the object corresponds to a state $S_i\{2\}$ as an internal variable of the foreground model #2 (a position $f_i$ of the foreground appearance model $b_{fg}\{2\}$ on the background), the initial position corresponds to an initial state probability $\pi\{2\}$, and the motion of the object corresponds to a transition probability $a_{ij}\{2\}$ of the HMM without an action condition, respectively.

In addition, an image of the background (the appearance of the background) in the assumed environment corresponds to a background appearance model $b_{world}$ of the background model.

The entire appearance of the assumed environment (the appearance of the environment) can be generated by disposing the image of the hands of the agent and the image of the object to be operated on the image of the background of the assumed environment.

Furthermore, by cutting out the range of the visual field of the agent from the entire appearance of the assumed environment, it is possible to obtain an observation series O of the image captured by the camera of the agent.

Herein, the visual field of the agent corresponds to the visual field area R described in FIG. 5.

In the separation learning model, using, as learning data, the observation series O of the image captured by the camera, the known action series U as the driving signal for driving the hands, and the visual field area R, learning of the assumed environment is performed and parameters of the separation learning model are obtained.

In other words, in regard to the foreground model #1 corresponding to the hands, the foreground appearance model $b_{fg}\{1\}$ corresponding to the appearance of the hands, the initial state probability $\pi_1\{1\}$ corresponding to the initial position of the hands, and the transition probability $a_{ij}\{1\}$ of the HMM with an action condition corresponding to the motion of the hands are obtained.

In regard to the foreground model #2 corresponding to the object, the foreground appearance model $b_{fg}\{2\}$ corresponding to the appearance of the object, the initial state probability $\pi_i\{2\}$ corresponding to the initial position of the object, and the transition probability $a_{ij}\{2\}$ of the HMM without an action condition corresponding to the motion of the object are obtained.

In addition, in the background model corresponding to the background of the assumed environment, the background appearance model $b_{world}$ corresponding to the appearance of the background is obtained.

Furthermore, in FIG. 8, in order to simplify the description, the assumed environment where one foreground with an action and one foreground without an action are mixed on the background has been shown, but it is possible to also express an environment where a plurality of foregrounds with an action and a plurality of foregrounds without an action are mixed with the same graphical model as in FIG. 8, and further to learn the environment with the separation learning model.

[Clause 5.2 Parameter Updating based on Entropy Estimation of Transition Probability]

It is possible to learn, with the method described in Chapter 3, the separation learning model in which the foreground model with an action condition and the foreground model without an action condition are mixed (hereinafter, also referred to as a mixture model).

However, the method described in Chapter 3 does not guarantee that the foreground with an action corresponding to the hands of the agent is learned in the foreground model with an action condition and the foreground without an action corresponding to the object to be operated is learned in the foreground model without an action condition.

This is because, the learning principle of the Baum-Welch algorithm is a learning method of parameter convergence based on gradient learning, and therefore, the learning may be trapped in local minimum by initial value dependency of parameters (models).

In a typical pattern of the local minimum, learning of the foreground without an action is started by a foreground model with an action condition, or learning of the foreground with an action is started by a foreground model without an action condition, and then, the foreground model that started the learning will not be able to switch the target of learning to the other foreground.

In theory, it is guaranteed that it is more likely to learn the foreground with an action by the foreground model with an action condition than to learn by the foreground model without an action condition, but in the present disclosure, in order to prevent learning from getting stagnated due to initial value dependence, it is possible to adopt an estimation process for promoting a foreground model to externally switching a foreground that is a target to be learned (hereinafter, also referred to as a switching promotion process).

Figure 9:
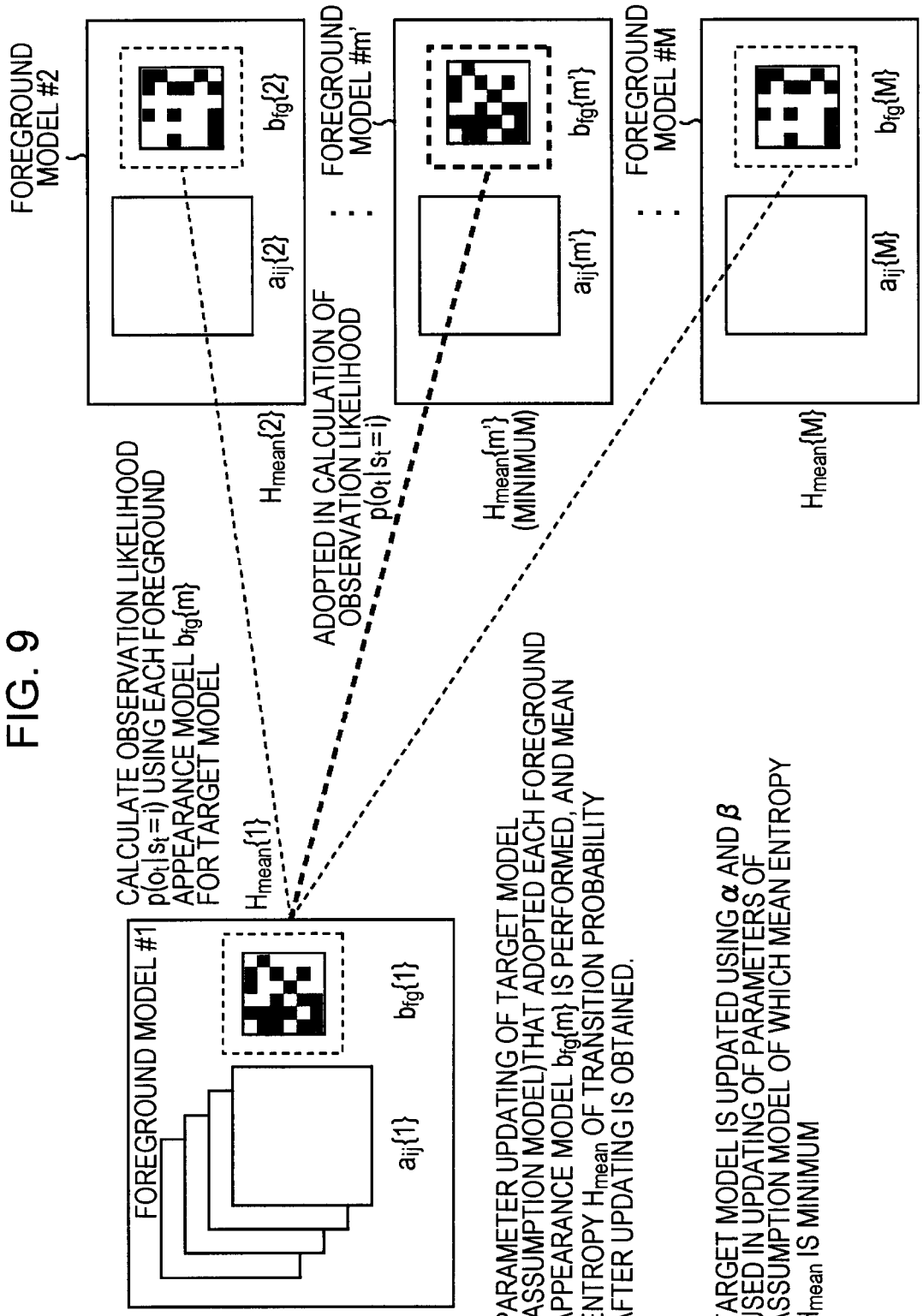
FIG. 9 is a diagram illustrating a switching promotion process.

FIG. 9 is a diagram illustrating the switching promotion process.

In the switching promotion process, in terms of putting order of priority in updating the foreground model described in Chapter 4, the foreground model with an action condition is put with priority to the foreground model without an action condition so as to be selected as a target model.

Furthermore, in the switching promotion process, as a foreground appearance model $b_{fg}\{m\}$ of a foreground model #m with an action condition selected as the target model, assumption models VM#1 to VM#M in which foreground appearance model $b_{fg}\{1\}$ to $b_{fg}\{M\}$ of M foreground models #1 to #M included in the mixture model are employed are updated using an observation value O of an image and an action U.

Herein, in FIG. 9, the foreground model #1 is selected as a target model.

After that, in the switching promotion process, for each of the assumption models VM#1 to VM#M after updating, a mean entropy $H_{mean}$ of a transition probability is obtained according to Formula (24).

$$H_{mean} = -\frac{1}{K}\frac{1}{N}\sum_{k=1}^{K}\sum_{j=1}^{N}\sum_{i=1}^{N} a_{ij}(w_k)\ln a_{ij}(w_k) \quad (24)$$

Herein, the transition probability $a_{ij}(w_k)$ of Formula (24) is a transition probability of the assumption model (after updating). In addition, ln indicates a natural logarithm (a logarithm having a Napier's constant as the base).

Furthermore, in the switching promotion process, among the assumption models VM#1 to VM#M after updating, an assumption model VM#m' in which the mean entropy $H_{mean}$ of a transition probability is the minimum is obtained (detected) according to Formula (25).

$$m' = \underset{m}{\mathrm{argmin}}[H_{mean}\{m\}] \quad (25)$$

$$= \underset{m}{\mathrm{argmin}}\left[-\frac{1}{K}\frac{1}{N}\sum_{k=1}^{K}\sum_{j=1}^{N}\sum_{i=1}^{N} a_{ij}\{m\}(w_k)\ln a_{ij}\{m\}(w_k)\right]$$

Herein, in Formula (25), argmin [ ] indicates a variable m that gives a minimum value in the parenthesis [ ]. In addition, $a_{ij}\{m\}(w_k)$ indicates a transition probability of the assumption model VM#m (after updating), and $H_{mean}\{m\}$ indicates a mean entropy of the transition probability $a_{ij}\{m\}(w_k)$ of the assumption model VM#m.

In the switching promotion process, using the assumption model VM#m' in which the entropy of a transition probability is the minimum among the assumption models VM#1 to VM#M after updating, the observation likelihood $p(o_t|s_t=i)$ of Formula (1) is obtained, and the observation likelihood $p(o_t|s_t=i)$ is used as an observation likelihood of the target model so as to update the initial state probability $\pi_i\{m\}$, the transition probability $a_{ij}\{\ \}$, and the foreground appearance model $b_{fg}\{m\}$ of the target model.

As described above, switching of a foreground of which a foreground model with an action condition is to be learned is promoted so that the foreground of which the foreground model with an action condition is to be learned become a foreground with an action by selecting the foreground model with an action condition is preferentially selected as a target model and setting to be the foreground appearance model $b_{fg}\{m\}$ of the foreground model #m with an action condition selected as the target model, updating the assumption models VM#1 to VM#M in which the foreground appearance models $b_{fg}\{1\}$ to $b_{fg}\{m\}$ of M foreground models #1 to #M included in the mixture model are respectively employed using the observation value O of the image and the action U, obtaining the observation likelihood $p(o_t|s_t=i)$ using the assumption model VM#m' in which the mean entropy of a transition probability is the minimum among the assumption models VM#1 to VM#M after updating, and updating the initial state probability $\pi_i\{m\}$, the transition probability $a_{ij}\{m\}$, and the foreground appearance model $b_{fg}\{m\}$ of the target model using the observation likelihood $p(o_t|s_t=i)$ as observation likelihood of the target model.

Figure 10:
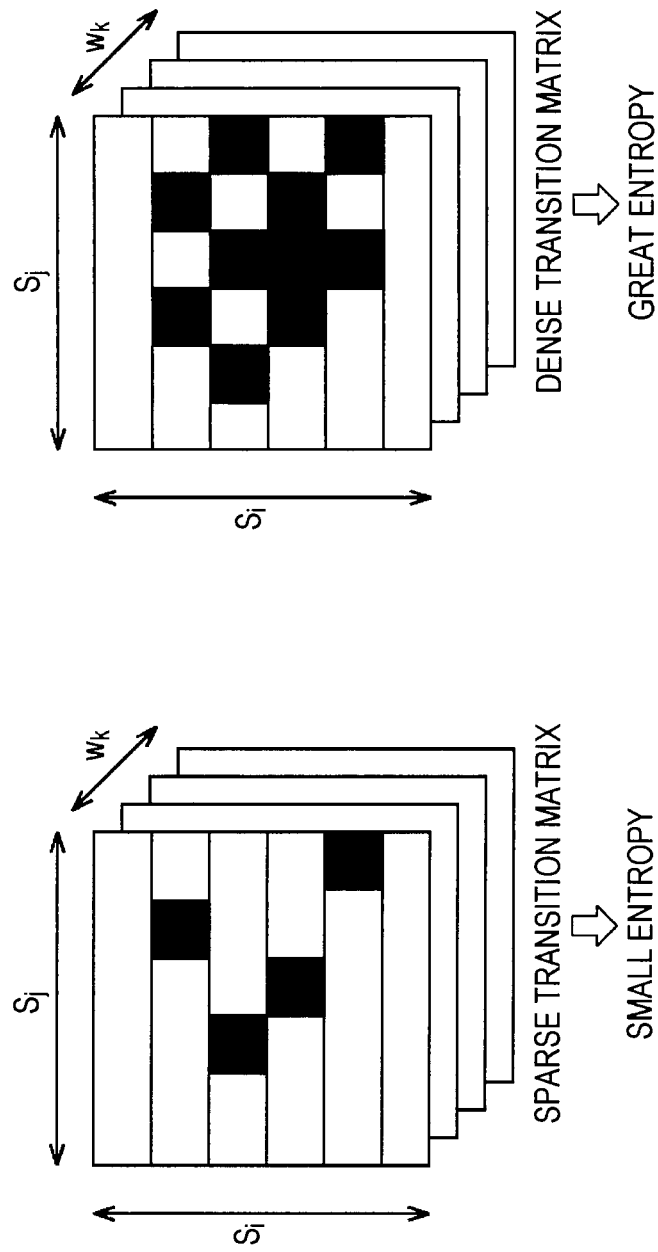
FIG. 10 is a diagram illustrating a transition probability of the foreground model with an action condition.

FIG. 10 is a diagram illustrating a transition probability of the foreground model with an action condition.

Since the foreground model with an action condition has a transition probability $a_{ij}(w_k)$ for each action, a transition probability from a certain state i exists per action.

When an action series U that is given to the foreground model with an action condition as the target model corresponds to a movement of the foreground appearance model $b_{fg}$ included in the target model, a transition probability from the state i is separated for each action $w_k$.

In other words, if an action $w_k$ given to the target model as learning data corresponds to (is linked to) the movement of the foreground appearance model $b_{fg}$ of the target model, when an action $w_k$ is performed in the state i of the target model, a transition probability $a_{ij}(w_k)$ for transiting to one specific state j becomes 1.

Specifically, for example, when there are a possibility of transiting from the state i to four states j={1, 2, 3, 4}, a possibility of performing four actions $w_k=\{w_1, w_2, w_3, w_4\}$, and a certain action $w_j$ is performed, if the foreground appearance model $b_{fg}$ of the target model moves from a position $f_i$ corresponding to the state i to a position $f_3$ corresponding to a certain state j, a transition probability $a_{ij}(w_k)$ becomes 1, and a transition probability $a_{ij}(w_k)$ becomes 0 for k that is not equal to j.

As described above, if an action $w_k$ given to the target model as learning data corresponds to the movement of the foreground appearance model $b_{fg}$ of the target model, when an action $w_k$ is performed in the state i, a transition probability $a_{ij}(w_k)$ of state transition from the state i corresponding to the movement of the foreground appearance model $b_{fg}$ corresponding to the action $w_k$ becomes 1, and a transition probability of other state transition from the state i becomes 0.

As a result, when an action $w_k$ given to the target model as learning data corresponds to the movement of the foreground appearance model $b_{fg}$ of the target model, in regard to the transition probability when a certain action $w_k$ is performed in a certain state i, a transition probability of state transition to one specific state j becomes 1, and a transition probability of state transition to other state becomes 0, as shown in FIG. 10.

Herein, FIG. 10 shows a transition probability $a_{ij}$ ($w_k$) per action $w_k$, and portions colored in black in FIG. 10 indicate transition probabilities that are not 0.

Therefore, when an action $w_k$ given to the target model as learning data corresponds to the movement of the foreground appearance model $b_{fg}$ of the target model, since a transition probability of which value is not 0 among transition probabilities from each state i concentrates on state transition to the specific state j for each action $w_k$, the mean entropy of the transition probabilities becomes small.

On the other hand, when the action series u given to the foreground model with an action condition as the target model does not correspond to the movement of the foreground appearance model $b_{fg}$ included in the target model, the state transition from the state i is not separated for each action $w_k$.

In other words, if an action $w_k$ given to the target model as learning data does not correspond to (is not linked to) the movement of the foreground appearance model $b_{fg}$ of the target model, when an action $w_k$ is performed in the state i of the target model, a transition probability $a_{ij}(w_k)$ for transiting to each state j disperses.

Specifically, for example, when there is a possibility of transiting from the state i to four states j={1, 2, 3, 4}, if an action $w_k$ given to the target model as learning data does not correspond to the movement of the foreground appearance model $b_{fg}$ of the target model, there is a possibility that the foreground appearance model $b_{fg}$ of the target model moves from the position $f_i$ corresponding to the state i to any one of positions $f_1$, $f_2$, $f_3$, and $f_4$ respectively corresponding to states j=1, 2, 3, 4 when the action $w_k$ is performed, and as a result, transition probabilities $a_{i1}(w_j)$, $a_{i2}(w_j)$, $a_{i3}M)$, and $a_{i4}(w_j)$ from the state i become substantially the same value that is, for example, 0.25.

As described above, if an action $w_k$ given to the target model as learning data does not correspond to the movement of the foreground appearance model $b_{fg}$ of the target model, when an action $w_k$ is performed in the state i, transition probabilities of state transition from the state i corresponding to the movement of the foreground appearance model $b_{fg}$ (transition probabilities of which the values are not 0) disperses in each state j of the transition destination.

As a result, when an action $w_k$ given to the target model as learning data does not correspond to the movement of the foreground appearance model $b_{fg}$ of the target model, in regard to the transition probabilities when a certain action $w_k$ is performed in a certain state i, transition probabilities of state transition to each of a plurality of states j become values (portions colored in black) that are not 0 as shown in FIG. 10.

Therefore, when an action $w_k$ given to the target model as learning data does not correspond to the movement of the foreground appearance model $b_{fg}$ of the target model, since a transition probability of which value is not 0 among transition probabilities from each state i does not concentrate on state transition to the specific state j for each action $w_k$, the mean entropy of the transition probabilities becomes large.

Herein, the case where an action $w_k$ given to the target model as learning data does not correspond to the movement of the foreground appearance model $b_{fg}$ of the target model includes a case where the foreground (foreground with an action) that performs a movement corresponding to the action $w_k$ given to the target model as learning data is learned in a foreground model other than the target model, and a case where the foreground without an action is learned in the target model.

In the switching promotion process, as described above, the assumption models VM#1 to VM#M in which the foreground appearance models $b_{fg}\{1\}$ to $b_{fg}\{m\}$ of M foreground models #1 to #M included in the mixture model are respectively employed as the foreground appearance model $b_{fg}\{m\}$ of the foreground model #m with an action condition selected in the target model are updated using the observation value O of the image and the action U, the assumption model VM#m' of which the mean entropy of the transition probability is the minimum among the assumption models VM#1 to VM#M after updating is detected.

There is a high possibility that the foreground learned in the assumption model VM#m' of which the mean entropy of the transition probability is the minimum (foreground of which the appearance is learned in the foreground appearance model $b_{fg}\{m\}$ employed in the generation of the assumption model VM#m') is the foreground performing a movement corresponding to the action $w_k$ given to the target model as learning data (foreground with an action), and therefore, in the switching promotion process, in order to promote the foreground to be switched to a learning target of the target model, the initial state probability $\pi_i\{m\}$, the transition probability $a_{ij}\{m\}$, and the foreground appearance model $b_{fg}\{m\}$ of the target model are updated using the observation likelihood $p(o_t|s_t=i)$ of the assumption model VM#m' of which the mean entropy of the transition probability is the minimum.

In the present disclosure, the exclusive restriction process described in Chapter 4 as well as the switching promotion process described above can be performed.

By the functioning switching promotion process, learning of the foreground with an action is preferentially performed through the foreground model with an action condition, and then, learning of the foreground without an action is performed through the foreground model without an action condition having low order of priority.

In addition, by the functioning exclusive restriction process, different foregrounds are learned in different foreground models (learning of the same foreground in different foreground models is prevented).

Therefore, by having both the switching promotion process and the exclusive restriction process function, when a plurality of foregrounds are includes in observation values of an image, one foreground is learned in one foreground model, a foreground with an action is learned in a foreground model with an action condition, and a foreground without an action is learned in a foreground model without an action condition.

In other words, according to the present disclosure, when the plurality of foregrounds can be separated and learned in a self-organizing manner, and include the foreground with an action and the foreground without an action, the foreground without an action is learned in the foreground model without an action condition, and the foreground with an action is learned in the foreground model with an action condition.

[One Embodiment of Agent to which the Present Disclosure is Applied]

Figure 11:
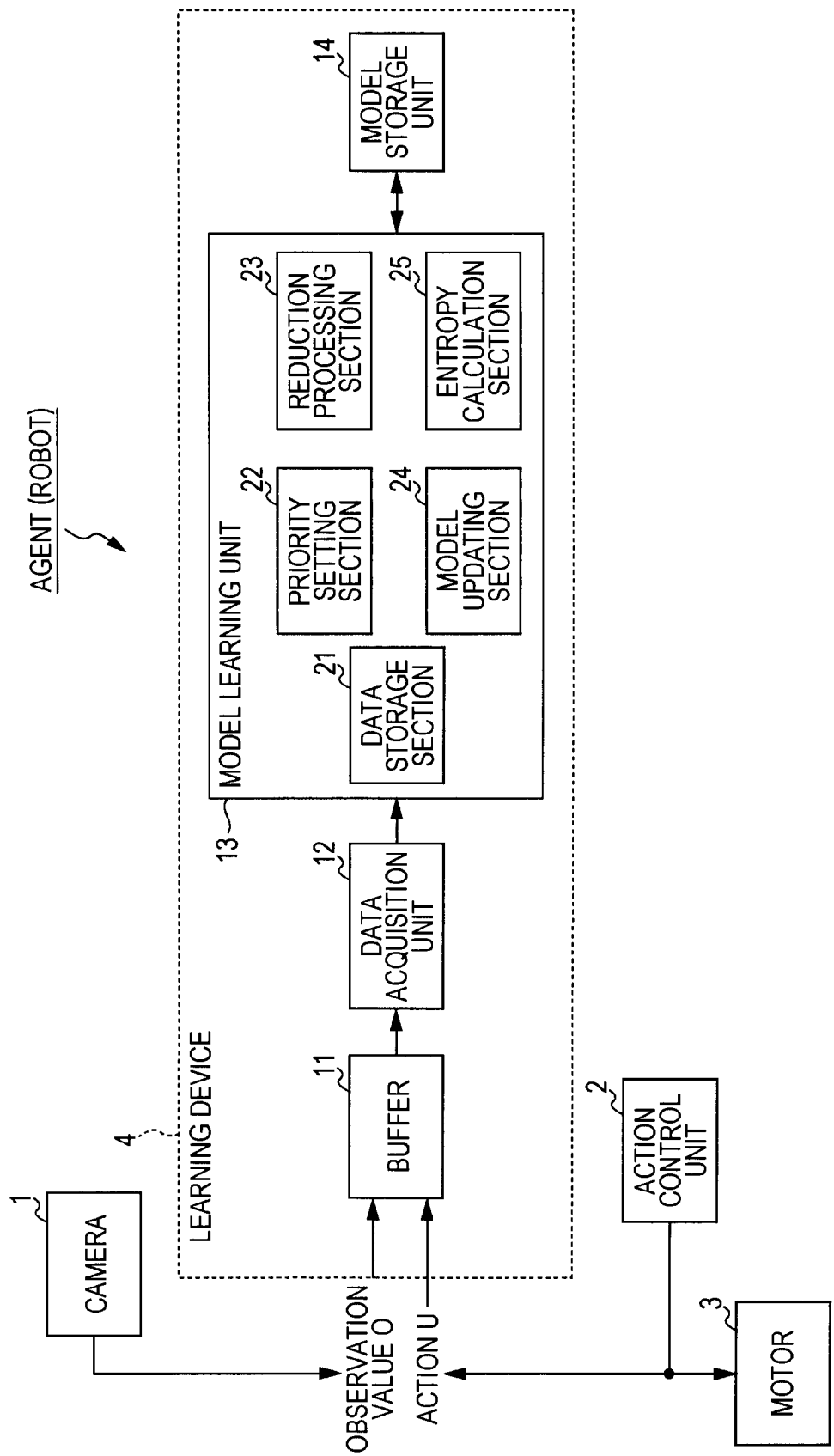
FIG. 11 is a block diagram showing a configuration example of an embodiment of an agent to which the present disclosure is applied.

FIG. 11 is a block diagram showing a configuration example of an embodiment of the agent to which the present disclosure is applied.

In FIG. 11, a robot as, for example, an agent includes a camera 1, an action control unit 2, a motor 3, and a learning device 4.

The camera 1 captures images and supplies an observation value O of an image to the learning device 4.

The action control unit 2 generates (a signal of) an action U as a driving signal for driving the motor 3, and supplies the action to the motor 3 and the learning device 4.

The motor 3 is driven according to the action U from the action control unit 2, and accordingly, for example, hands not shown in the drawing move.

The learning device 4 includes a buffer 11, a data acquisition unit 12, a model learning unit 13, and a model storage unit 14, and uses the observation value O of the image from the camera 1, and further the action U from the action control unit 2 as learning data to perform learning of a separation learning model.

Herein, the learning data includes the visual field area described in FIG. 5 in addition to the observation value O of the image and the action U. When the camera 1 is mounted on the head part of the agent, the visual field area R is recognized, for example from an angle of the head part of the agent, or the like.

In the learning device 4, the buffer 11 temporarily stores the observation value O from the camera 1 and the action U from the action control unit 2.

The data acquisition unit 12 acquires a part of the whole of the observation value O and the action U stored in the buffer 11, and supplies to the model learning unit 13.

The model learning unit 13 performs learning of the separation learning model (updating of parameters) using the learning data from the data acquisition unit 12.

In other words, the model learning unit 13 includes a data storage section 21, a priority setting section 22, a reduction processing section 23, a model updating section 24, and an entropy calculation section 25.

The data storage section 21 temporarily stores the learning data from the data acquisition unit 12. In addition, the data storage section 21 stores an intermediate result of updating computation when incremental learning of the separation learning model is performed.

The priority setting section 22 sets order of priority of one or more foreground models included in the separation learning model.

The reduction processing section 23 performs a reduction process (of FIG. 7) for the observation value O of an image as learning data stored in the data storage section 21.

The model updating section 24 performs learning of the separation learning model using the learning data stored in the data storage section 21, in other words, updating of parameters of the separation learning model.

The entropy calculation section 25 calculates a mean entropy $H_{mean}$ of transition probabilities for an assumption model according to Formula (24) in the switching promotion process described in FIG. 9.

The model storage unit 14 stores (parameters of) the separation learning model.

[Learning Process]

Figure 12:
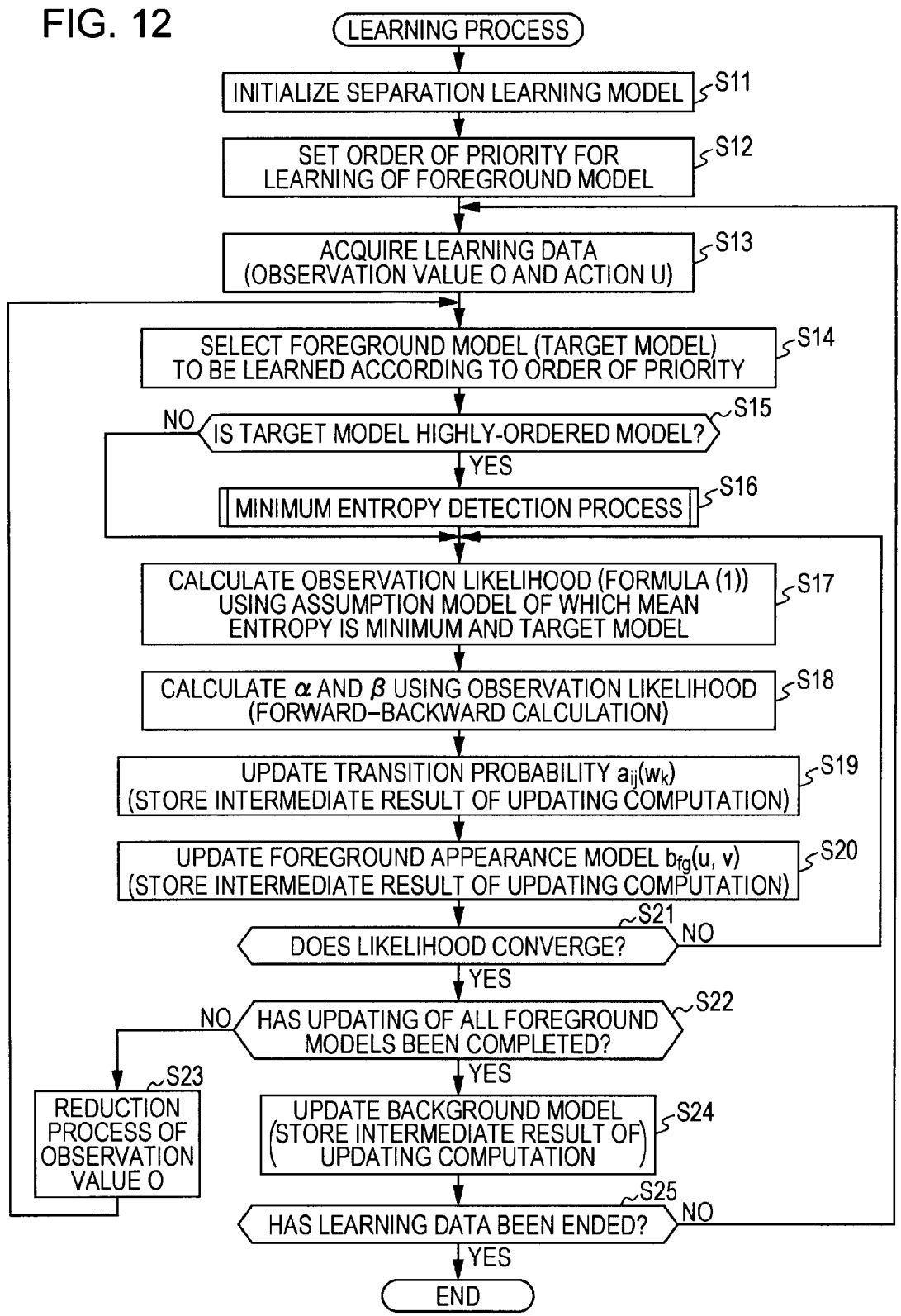
FIG. 12 is a flowchart explaining a learning process.

FIG. 12 is a flowchart explaining a process of learning (a learning process) of the separation learning model performed by the learning device 4 of FIG. 11.

In Step S11, the model updating section 24 initializes (parameters of) the separation learning model stored in the model storage unit 14, and the process advances to Step S12.

In Step S12, the priority setting unit 22 sets order of priority for learning of foreground models included in the separation learning model stored in the model storage unit 14, and the process advances to Step S13.

Herein, when the separation learning model includes a foreground model with an action condition and a foreground model without an action condition, the priority setting unit 22 sets higher order of priority for the foreground model with an action condition than for the foreground model without an action condition.

Furthermore, when the separation learning model includes a plurality of foreground models as foreground models with an action condition, the order of priority among the plurality of foreground models with an action condition can employ an arbitrary order.

In the same manner, when the separation learning model includes a plurality of foreground models as foreground models without an action condition, the order of priority among the plurality of foreground models without an action condition can employ an arbitrary order.

In Step S13, the data acquisition unit 12 acquires learning data a predetermined length amount of latest series that has not been used in learning of the separation learning model from the learning data stored in the buffer 11, and supplies the data to the data storage unit 21 to store the data.

In addition, the process advances from Step S13 to Step S14, and the model updating section 24 selects the foreground model with the highest order of priority as a target model to be learned among foreground models that have not been learned using the learning data stored in the data storage section 21 from the foreground models included in the separation learning model stored in the model storage unit 14 in accordance with order of priority set by the priority setting section 22, and the process advances to Step S15.

In Step S15, the model updating section 24 determines whether or not the target model is a high-ordered model having high priority, in other words, a foreground model with an action condition.

In Step S15, if the target model is determined not to be a foreground model with an action condition that is a high-ordered model, in other words, when the target model is a foreground model without an action condition, the process skips Step S16 and advances to Step S17.

In addition, in Step S15, when the target model is determined to be the foreground model with an action condition that is a high-ordered model, the process advances to Step S16, and the model learning unit 13 performs a minimum entropy detection process and the process advances to Step S17.

Herein, in the minimum entropy detection process, as a foreground appearance model of the foreground model with an action condition selected as the target model, an assumption model is generated in which it is assumed that foreground appearance models of one or more foreground model included in the separate learning model are respectively employed. In addition, the assumption model is updated using the learning data stored in the data storage section 21, and an assumption model of which the mean entropy of transition probabilities is the minimum is detected among assumption models after updating.

In Step S17, the model updating section 24 obtains an observation likelihood $p(o_t|s_t=i)$ used in updating of the target model according to Formula (1), and the process advances to Step S18.

Herein, when the target model is a foreground model without an action condition, in Step S17, the observation likelihood $p(o_t|s_t=i)$ of Formula (1) is obtained as an observation likelihood $p(o_t|s_t=i)$ used in updating of the target model using the foreground model without an action condition.

In addition, when the target model is a foreground model with an action condition, the observation likelihood $p(o_t|s_t=i)$ of Formula (1) is obtained as an observation likelihood $p(o_t|s_t=i)$ used in updating of the target model, using the assumption model whose mean entropy of transition probabilities is the minimum, which is detected in Step S16.

In Step S18, the model updating section 24 obtains a forward probability $\alpha_t(i)$ and a backward probability $\beta_t(i)$ of the target model using the observation likelihood $p(o_t|s_t=i)$ used in updating of the target model that is obtained in Step S17, and the process advances to Step S19.

In Step S19, the model updating section 24 updates the initial state probability $\pi_i$ of the target model using the forward probability $\alpha_t(i)$ and the backward probability $\beta_t(i)$ obtained in Step S18.

Furthermore, in Step S19, the model updating section 24 updates a transition probability $a_{ij}$ (or $a_{ij}(w_k)$) of the target model using the forward probability $\alpha_t(i)$ and the backward probability $\beta_t(i)$ obtained in Step S18, and causes the data storage section 21 to store (overwrite) the intermediate result of updating computation of the transition probability $a_{ij}$ if necessary, and the process advances to Step S20.

Furthermore, when the target model is the foreground model with an action condition, and the observation likelihood $p(o_t|s_t=i)$ of Formula (1) is obtained as an observation likelihood $p(o_t|s_t=i)$ used in updating of the target model, using the assumption model of which the mean entropy of transition probabilities is the minimum (hereinafter, also referred to as a minimum assumption model) in Step S17, the transition probability of the minimum assumption model generated from the target model is also updated in the same manner (to the same value) as the transition probability of the target model in Step S19.

In Step S20, the model updating section 24 updates a foreground appearance model $b_{fg}$ of the target model using the forward probability $\alpha_t(i)$ and the backward probability $\beta_t(i)$ obtained in Step S18, and if necessary, the intermediate result of updating computation of the foreground appearance model $b_{fg}$ is made to be stored (overwritten) in the data storage section 21, and the process advances to Step S21.

In Step S21, the model updating section 24 calculates a likelihood L with which the learning data is observed in the separation learning model after updating of the target model, and determines whether or not the likelihood L converges.

Herein, in the separation learning model after updating of the target model, the likelihood L with which the learning data is observed can be obtained according to, for example, Formula (26).

$$L = \log\left(\sum_{i=1}^{N} \alpha_T(i)\right) \quad (26)$$

Herein, T of Formula (26) indicates a series length of the learning data stored in the data storage section 21 in Step S13.

When the target model is the foreground model without an action condition, the likelihood L of Formula (26) is calculated by using the forward probability $\alpha_t(i)$ of Formula (2) obtained using observation values $O=\{o_1, o_2, \ldots, o_T\}$ of an image included in the learning data of which the series length is T.

In addition, when the target model is the foreground model with an action condition, the likelihood L of Formula (26) is calculated by using the forward probability $\alpha_t(i)$ of Formula (11) obtained using observation values $O=\{o_1, o_2, \ldots, o_T\}$ of an image and action series $U=\{u_0, u_1, \ldots, U_{T-1}\}$ included in the learning data of which the series length is T.

Herein, if, in the target model, the latest likelihood L obtained in Step S21 is indicated by $L_{new}$ and the previous likelihood L obtained in Step S21 is indicated by $L_{old}$, it is determined whether or not the likelihood L converges in Step S21 based on the fact whether or not an increment $L_{new}$-$L_{old}$ of the latest likelihood $L_{new}$ from the previous likelihood $L_{old}$ is (equal to or) less than a predetermined threshold value $\epsilon$.

In other words, when the increment $L_{new}$-$L_{old}$ of the likelihood is less than the predetermined threshold value $\epsilon$, the likelihood L is determined to converge.

Furthermore, the previous likelihood $L_{old}$ is initialized as a variable to a sufficiently small negative value during updating of first parameters of the target model.

In Step S21, when the likelihood L is determined not to converge, the process returns to Step S17, and the same next process is repeated.

In addition, in Step S21, when the likelihood L is determined to converge, the process advances to Step S22, and the model updating section 24 determines whether or not updating of all (parameters of) the foreground models included in the separation learning model has been completed.

In Step S22, when it is determined that updating of all of the foreground models included in the separation learning model has not been completed yet, the process advances to Step S23, and the reduction processing section 23 performs a reduction process of the observation value O of the image included in the learning data stored in the data storage section 21.

Then, the process returns to Step S14 from Step S23, and the model updating section 24 newly selects a foreground model that will serve as a target model in accordance with order of priority set by the priority setting section 22, and the same next process is repeated.

In addition, in Step S22, when it is determined that updating of all foreground models included in the separation learning model has been completed, the process advances to Step S24, and the model updating section 24 updates the foreground appearance model $b_{world}$ of the separation learning model using the forward probability $\alpha_t(i)$, the backward probability $\beta_t(i)$, and the like of each foreground model obtained in Step S18, and causes the data storage section 21 to store (overwrite) the intermediate result of updating computation of the foreground appearance model $b_{world}$ if necessary, and the process advances to Step S25.

In Step S25, it is determined whether or not the data acquisition unit 12 has acquired all learning data (the learning data is ended) stored in the buffer 11.

In Step S25, when it is determined whether or not all learning data stored in the buffer 11 has not been acquired yet, the process returns to Step S13, and the same next process is repeated.

In addition, in Step S25, when it is determined that all learning data stored in the buffer 11 has been acquired, the process ends.

Furthermore, in Steps S19, S20, and S24, the intermediate result of updating computation stored in the data storage section 21 is used when updating computation using the next learning data is to be performed in a loop process from Step S13 to Step S25 that is incremental learning.

Herein, in FIG. 12, the minimum entropy detection process is performed in Step S16, an observation likelihood $p(o_t|s_t=i)$ used in updating of the target model is obtained using the assumption model of which the mean entropy of transition probabilities are the minimum in Step S17, and then updating of (parameters of) the target model is performed using the observation likelihood $p(o_t|s_t=i)$, which corresponds to the switching promotion process described in Chapter 5.

In addition, in FIG. 12, setting order of priority in Step S12 and performing the reduction process in Step S23 correspond to the exclusive restriction process described in Chapter 4.

Figure 13:
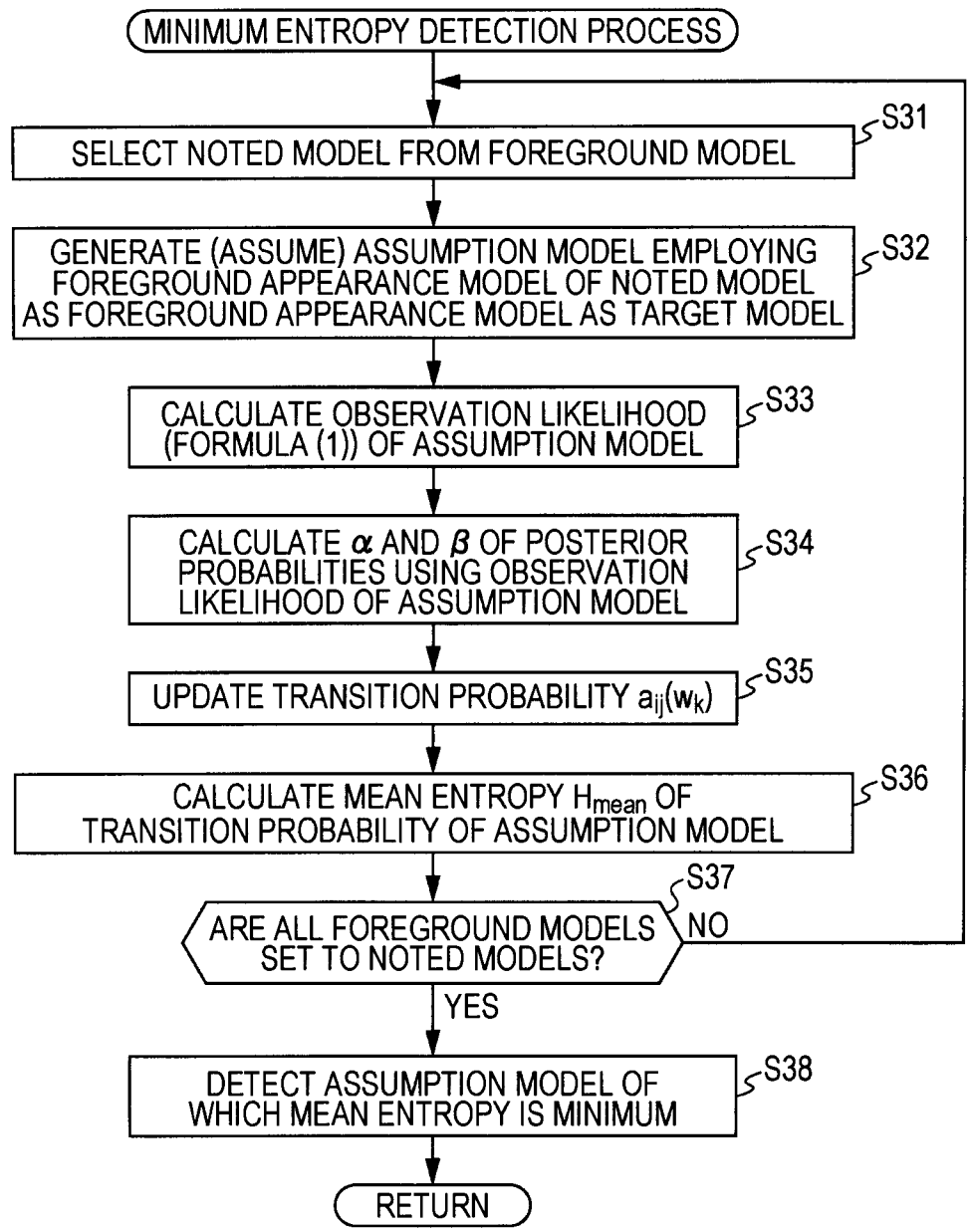
FIG. 13 is a flowchart explaining a minimum entropy detection process.

FIG. 13 is a flowchart explaining the minimum entropy detection process performed in Step S16 of FIG. 12.

In Step S31, the model updating section 24 selects one foreground model that has not been selected as a noted model to be noted as a noted model from one or more foreground models included in the separation learning model, and the process advances to Step S32.

In Step S32, the model updating section 24 generates an assumption model that adopts a foreground appearance model of the noted model as a foreground appearance model of the target model, and the process advances to Step S32.

In other words, the model updating section 24 generates, for example, a copy model obtained by copying the target model, and generates an assumption model by substituting a foreground appearance model of the copy model with the foreground appearance model of the noted model.

In Step S33, the model updating section 24 obtains an observation likelihood $p(o_t|s_t=i)$ of the assumption model using the learning data stored in the data storage section 21, and the process advances to Step S34.

In Step S34, the model updating section 24 obtains a forward probability $\alpha_t(i)$ and a backward probability $\beta_t(i)$ as posterior probabilities using the observation likelihood $p(o_t|s_t=i)$ of the assumption model, and the process advances to Step S35.

In Step S35, the model updating section 24 updates a transition probability $a_{ij}$ (or $a_{ij}(w_k)$) of the assumption model using the forward probability $\alpha_t(i)$, the backward probability $\beta_t(i)$, and the like obtained in Step S34, and the process advances to Step S36.

In Step S36, the entropy calculation section 25 obtains a mean entropy $H_{mean}$ of transition probabilities of the assumption model of which the transition probability is updated in Step S35 (assumption model after updating), and the process advances to Step S37.

In Step S37, the model updating section 24 determines whether or not all foreground models include in the separation learning model are set to noted models.

In Step S37, when all foreground models included in the separation learning model are determined not to have been set as noted models, the process returns to Step S31, and then, the same next process is repeated.

In addition, in Step S37, when all foreground models included in the separation learning model are determined to have been set as noted models, the process advances to Step S38, the entropy calculation section 25 detects an assumption model of which the mean entropy $H_{mean}$ of transition probabilities is the minimum as the minimum assumption model among assumption models employing each foreground appearance models of one or more foreground model included in the separation learning model as a foreground appearance model of the target model, and the process returns.

[Simulation]

Hereinafter, a simulation performed by the inventors of the present disclosure will be described.

Figure 14:
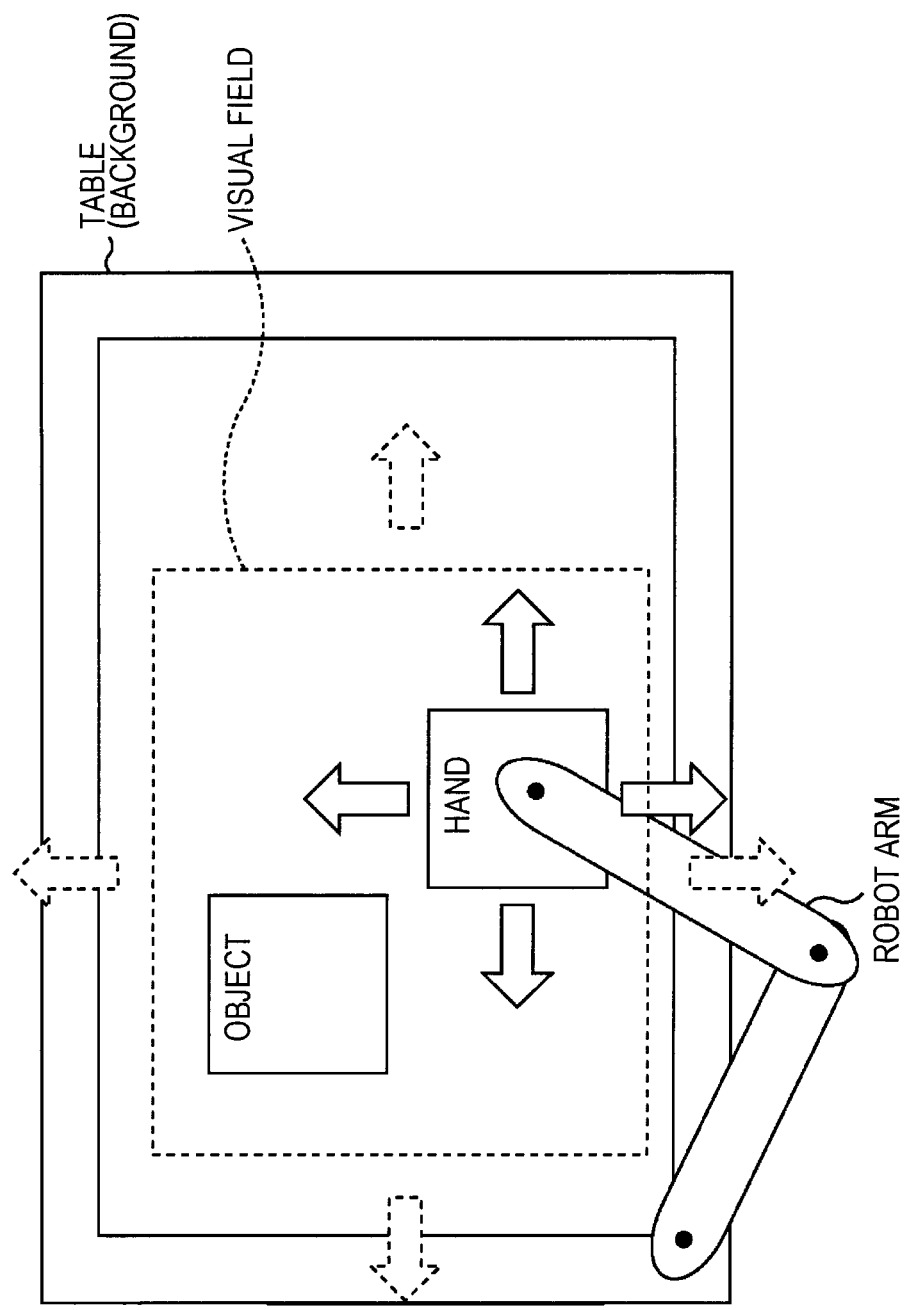
FIG. 14 is a diagram showing an environment setting of a simulation.

FIG. 14 is a diagram showing an environment setting of the simulation.

In the simulation, the environment setting is assumed in which there are one arm attached with a rectangular hand on the tip and one rectangular object as an operation target on the two-dimensional plane, and an image of a rectangular visual field range surrounded by a dotted line is obtained as an observation value O.

Furthermore, the hand and the visual field move in four direction of upper, lower, left, and right directions, and the object also moves in the four directions by interference (contact) of the hand.

Figure 15A:
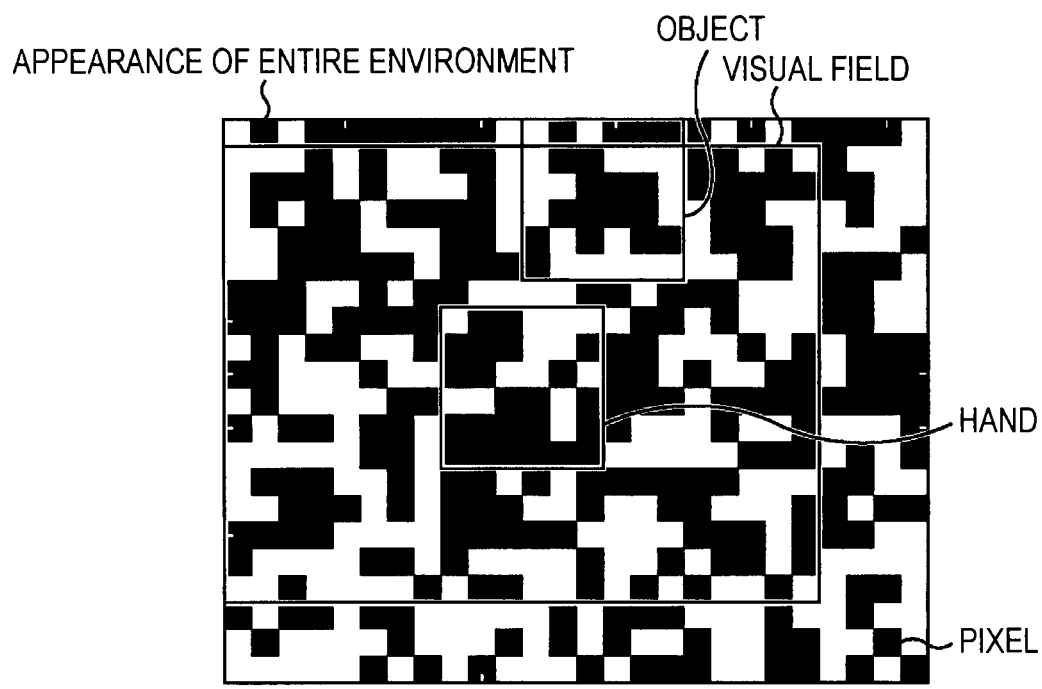
FIGS. 15A and 15B are diagrams showing images used in the simulation.
Figure 15B:
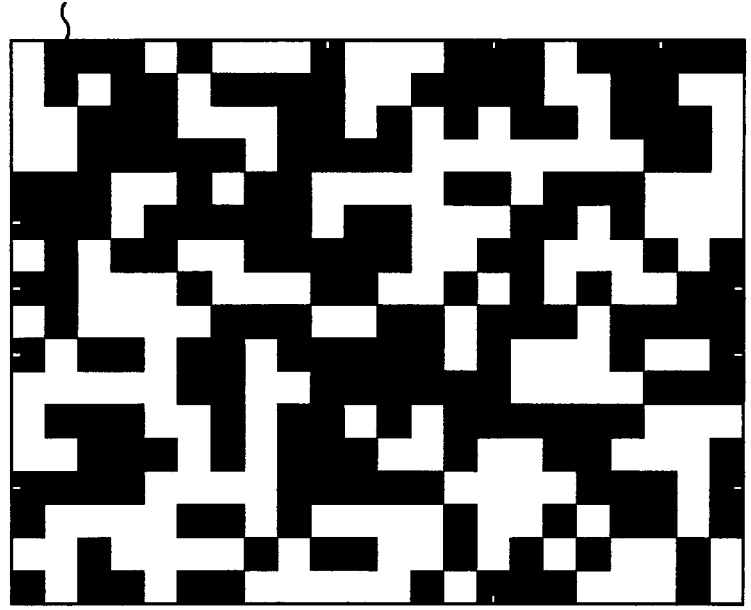

FIGS. 15A and 15B are diagrams showing images used in the simulation.

In the simulation, the appearance of the background and the foreground (texture) is expressed by binary bit-map images.

FIG. 15A shows an image of the entire environment, and FIG. 15B shows an image of the visual field range of the agent, that is, an image used as the observation value O.

FIG. 15A shows each area of the hand, the object, and the visual field in addition to the image of the entire environment.

The image as the observation value O of FIG. 15B is the image of the visual field range of FIG. 15A.

In the simulation, each area of the hand, the object, and the visual field is set to be able to move in any one direction of upper, lower, right, and left directions for one step (one time) by one pixel.

In addition, in the simulation, the image of the visual field range for each one step is used as the observation value O as learning data.

Figure 16:
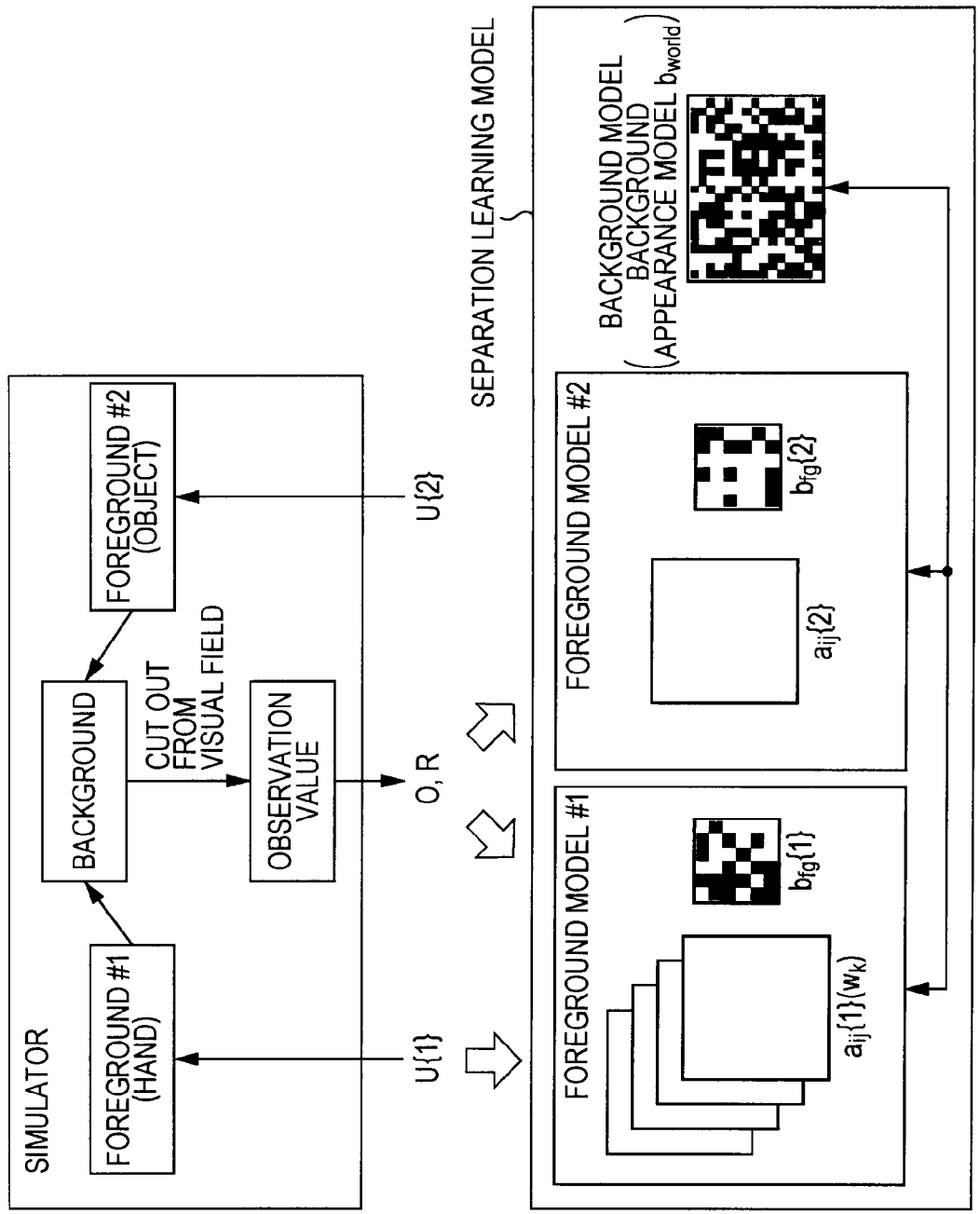
FIG. 16 is a diagram showing a simulator used in the simulation and the separation learning model.

FIG. 16 is a diagram showing a simulator used in the simulation and the separation learning model.

The simulator virtually generates the environment setting described in FIG. 14.

In other words, the simulator stores a foreground #1 that is the image of the hand, a foreground #2 that is the image of the object, and (the image of) the background.

In addition, the simulator causes the foreground #1 that is the image of the hand to move by giving an action U{1} to the hand. Furthermore, the simulator causes the foreground #2 that is the image of the object to move by giving, to the object, an action U{2} corresponding to interference of the hand to the object.

Then, the simulator overlaps the foregrounds #1 and #2 on the background, cuts out a visual field area R of the visual field of the agent from the background on which the foregrounds #1 and #2 are overlapped, and generates an observation value O of an image observed by the agent.

The separation learning model includes the two foreground models #1 and #2 and a background model.

The foreground model #1 is a foreground model with an action condition, and includes a transition probability $a_{ij}\{1\}$ $(w_k)$ and a foreground appearance model $b_{fg}\{1\}$ of an HMM with an action condition.

The foreground model #2 is a foreground model without an action condition, and includes a transition probability $a_{ij}\{2\}$ and a foreground appearance model $b_{fg}\{2\}$ of an HMM without an action condition.

The background model includes a background appearance model $b_{world}$.

Furthermore, the foreground models #1 and #2 further include an initial state probability $\pi_i$, but in FIG. 16, the initial state probability $\pi_i$ is omitted in the drawing.

In the simulation, an action $U\{1\}$ is given from the simulator to the foreground model #1 that is a foreground model with an action condition as learning data, and the observation value O and the visual field area R of the image are given from the simulator to the foreground models #1 and #2, and the background model as learning data.

Furthermore, in the simulation, since the action $U\{1\}$ given to the hand is a known action for the agent that the agent gives to the hand, the action $U\{1\}$ is used as learning data, but an action $U\{2\}$ corresponding to interference of the hand to the object is an unknown action for the agent, the action $U\{2\}$ is not used as learning data.

As described above, in the simulation, the action $U\{1\}$, the observation value O of the image, and the visual field area R are given to the separation learning model as learning data, and five parameters of the transition probability $a_{ij}\{1\}(w_k)$, the foreground appearance model $b_{fg}\{1\}$, the transition probability $a_{ij}\{2\}$, the foreground appearance model $b_{fg}\{2\}$, and the background appearance model $b_{world}$ are estimated.

Figure 17A:
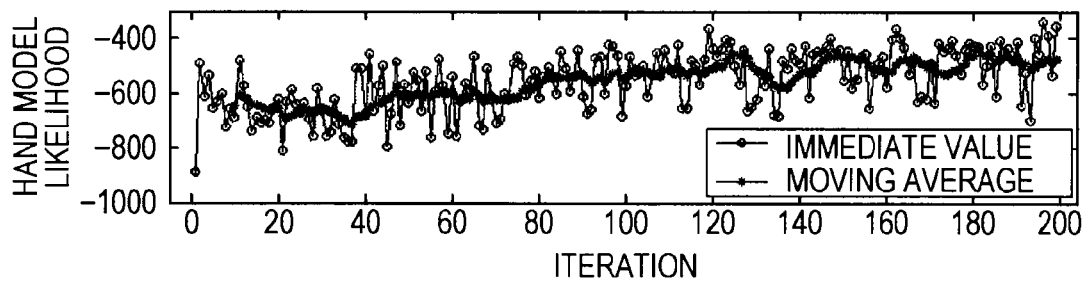
FIGS. 17A to 17D are diagrams showing the results of the simulation.
Figure 17B:
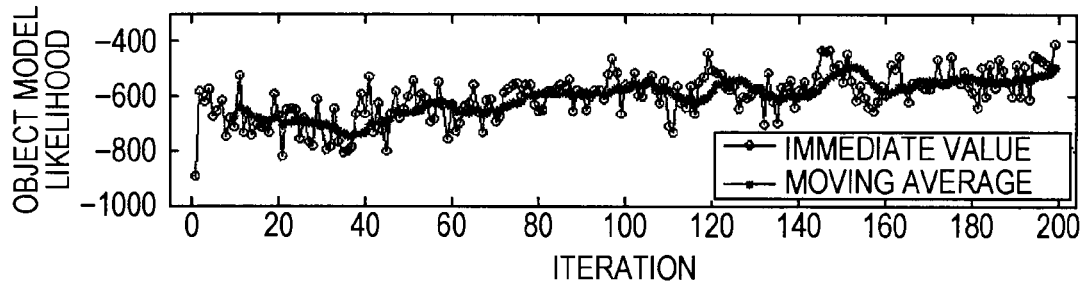
Figure 17C:
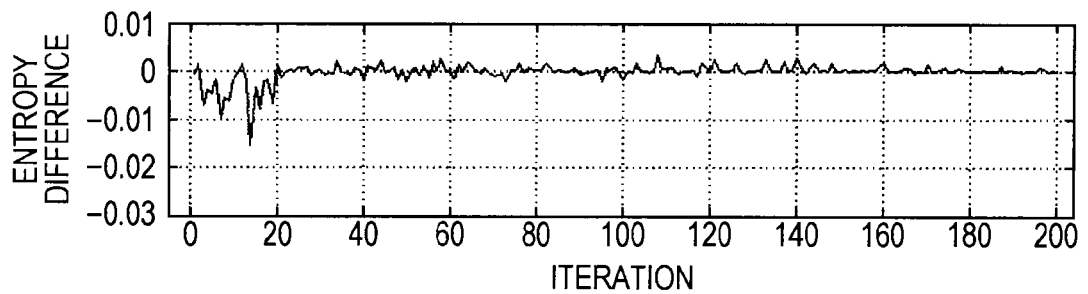
Figure 17D:
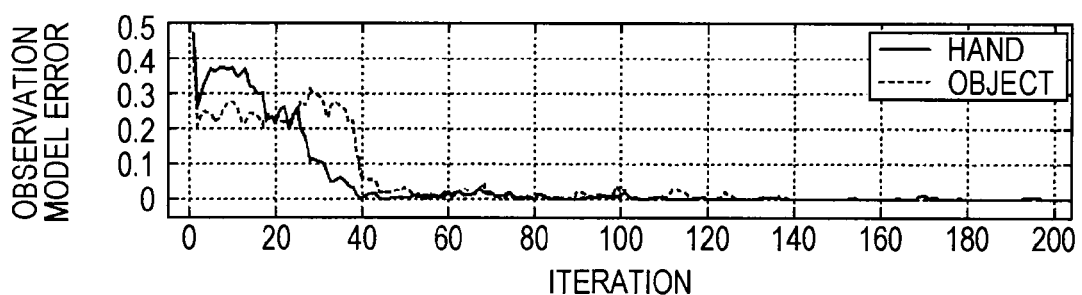
Figure 18:
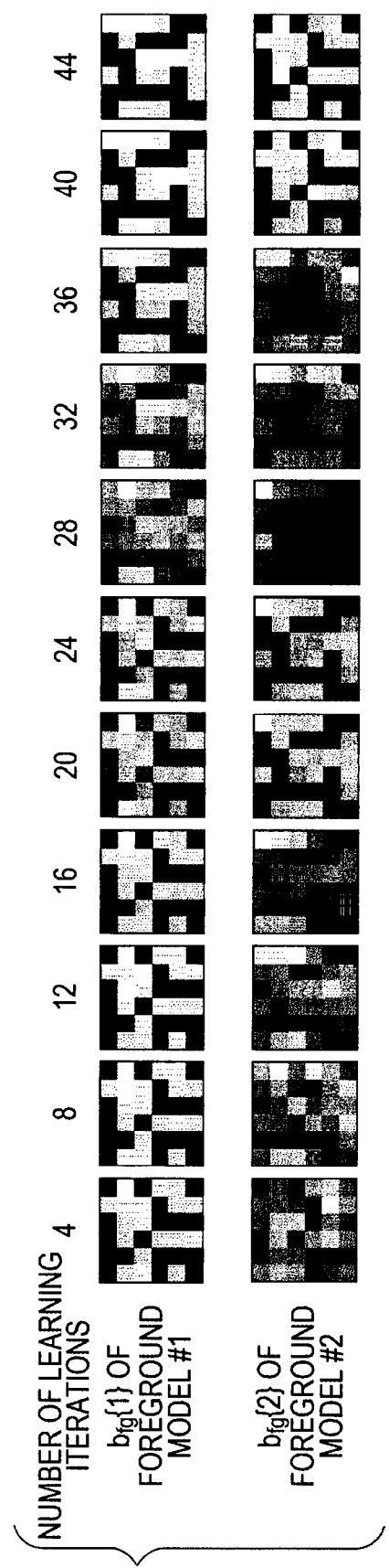
FIG. 18 is a diagram showing the results of the simulation.

FIGS. 17A to 18 are diagrams showing the results of the simulation.

FIG. 17A is a diagram showing a change of likelihood of the foreground model #1 for the number of times of learning.

In FIG. 17A, the horizontal axis indicates the number of times of learning (number of learning times, iteration), and the vertical axis indicates the likelihood of the foreground model #1.

Furthermore, in FIGS. 17A to 17D, the number of learning iterations C is 200, and learning of the separation learning model is ended.

In FIG. 17A (also in FIG. 17B), the circular marks indicate a likelihood of the foreground model #1 (immediate value) when learning is performed using learning data by the length of T/C and the likelihood L (of Formula (26)) of the separation learning model converges.

In FIG. 17A (also in FIG. 17B), the likelihood of the foreground model #1 is recognized to go up and down for each learning iteration C. This is because learning data used in learning is different in each learning iteration C, and the likelihood of the foreground model #1 decreases when an observation value O of an area that has not been learned (an area where the observation value O of the image has not been observed) is given as learning data.

In FIG. 17A (also in FIG. 17B), the star marks indicate a moving average of likelihoods for five times.

In the simulation, the number of iterations C is about 40 when the foreground #1 of the hand that is a foreground with an action is learned by the foreground appearance model $b_{fg}\{1\}$ of the foreground model #1 that is a foreground model with an action condition, and the foreground #2 of the object that is a foreground without an action is learned by the foreground appearance model $b_{fg}\{2\}$ of the foreground model #2 that is a foreground model without an action condition.

For this reason, the moving average of likelihoods tends to decrease until the number of learning iterations C is about 40, but after then, tends to increase.

FIG. 17B is a diagram showing changes in the likelihood of the foreground model #2 for the number of learning iterations C.

The likelihood of the foreground model #2 has the same tendency as that of the foreground model #1 of FIG. 17A.

FIG. 17C is a diagram showing changes in difference values of mean entropies for the number of learning iterations C.

In FIG. 17C, the horizontal axis indicates the number of learning iterations C and the vertical axis indicates the difference value of mean entropies.

Herein, a difference value of mean entropies refers to a difference $H_{mean}\{1\}-H_{mean}\{2\}$ obtained in such a way that, as a foreground appearance model of the foreground model #1 that is the foreground model with an action condition, a first assumption model in which it is assumed that the foreground appearance model $b_{fg}\{1\}$ of the foreground model #1 is employed and a second assumption model in which it is assumed that the foreground appearance model $b_{fg}\{2\}$ of the foreground model #2 is employed are updated using learning data, and the mean entropy $H_{mean}\{2\}$ of transition probabilities of the second assumption model after updating is deducted from the mean entropy $H_{mean}\{1\}$ of transition probabilities of the first assumption model after updating.

Through the switching promotion process, if the difference $H_{mean}\{1\}-H_{mean}\{2\}$ is equal to or higher than 0, the observation likelihood of the foreground model #1 is obtained as the observation likelihood of the foreground model #1 that is the foreground model with an action condition, and if the difference $H_{mean}\{1\}-H_{mean}\{2\}$ is a negative value, the observation likelihood of the second assumption model in which the foreground appearance model $b_{fg}\{2\}$ of the foreground model #2 is employed is obtained as the observation likelihood of the foreground model #1 that is the foreground model with an action condition.

FIG. 17D is a diagram showing changes in errors of the foreground appearance model for foregrounds in stored in the simulator.

In FIG. 17D, the horizontal axis indicates the number of learning iterations C, and the vertical axis indicates errors in the foreground appearance model.

In other words, in FIG. 17D, the solid line indicates errors of the foreground appearance model $b_{fg}\{1\}$ for the foreground #1 of the hand, and the dotted line indicates errors of the foreground appearance model $b_{fg}\{2\}$ for the foreground #2 of the object.

It can be ascertained that both errors of the foreground appearance model $b_{fg}\{1\}$ and of the foreground appearance model $b_{fg}\{2\}$ approaches 0 when the number of learning iterations C is about 40, and accordingly, in the foreground appearance model $b_{fg}\{1\}$, the foreground #1 as the appearance of the hand is acquired, and in foreground appearance model $b_{fg}\{2\}$, the foreground #2 as the appearance of the object is acquired.

FIG. 18 is a diagram showing changes of the foreground appearance model $b_{fg}\{1\}$ and the foreground appearance model $b_{fg}\{2\}$.

In other words, FIG. 18 shows the foreground appearance model $b_{fg}\{1\}$ and the foreground appearance model $b_{fg}\{2\}$ of each four times of learning among the number of learning iterations C from the fourth to the forty-fourth time.

In the initial stage of learning, the foreground appearance model $b_{fg}\{1\}$ learns and acquires the foreground #2 of the object.

The function of the exclusive restriction process is carried out as the foreground appearance model $b_{fg}\{1\}$ acquires the foreground #2 of the object, and the foreground appearance model $b_{fg}\{2\}$ learns and acquires the foreground #1 of the hand when the number of learning iterations C is about 20.

In addition, at the same time, the function of the switching promotion process is carried out and then switching of a foreground in which the foreground model #1 is the target of learning is promoted so that the foreground #1 of the hand that is the foreground with an action, not the foreground #2 of the object that is the foreground without an action, is learned in the foreground model #1 that is the foreground model with an action condition, and as a result, the foreground appearance model $b_{fg}\{1\}$ that acquired the foreground #2 of the object is first broken when the number of learning iterations C is about 28.

After that, when the number of learning iterations C is about 40, the foreground appearance model $b_{fg}\{1\}$ acquires the foreground #1 of the hand, and the foreground appearance model $b_{fg}\{2\}$ acquires the foreground #2 of the object by the function of the exclusive restriction process carried out.

As described above, in the present disclosure, by considering motions (movements) of a learning (recognition) target, and motions (movements) of the sight of the agent, preparing a separation learning model that describes an image as a generation model for generating an image to be observed, and estimating (model) parameters that describe an observation series of the image with an approach of maximum likelihood estimation, it is possible to acquire the separation learning model of the learning (recognition) target from the observation series of the image from learning, and to recognize a target object after learning, without having prior knowledge on the appearance of the learning (recognition) target in advance and marking the learning (recognition) target.

In addition, in the present disclosure, since the separation learning model considered changes in a background by motions (movements) of the sight of the agent, learning and recognition are not affected by a movement of the background caused by motions of the sight of the agent.

Furthermore, in the present disclosure, an observation model (foreground appearance model) of the hand of the agent is automatically made by making a model with an action by an action series that moves the hand and executing the maximum likelihood estimation, without designating a model on the appearance (appearance) of the hand.

In addition, in the present disclosure, since a body model used for recognizing and specifying the position of the hand and showing how the position of the hand changes when an action is given to the hand is acquired by learning as a transition probability, the model can be adaptively followed by incremental learning even when geometric conditions of the camera or the hand change.

[Description on Computer to which the Present Disclosure is Applied]

Next, a series of processes described above can be performed through hardware and software. When the series of processes are performed through software, a program constituting the software is installed in a general-purpose computer, or the like.

Figure 19:
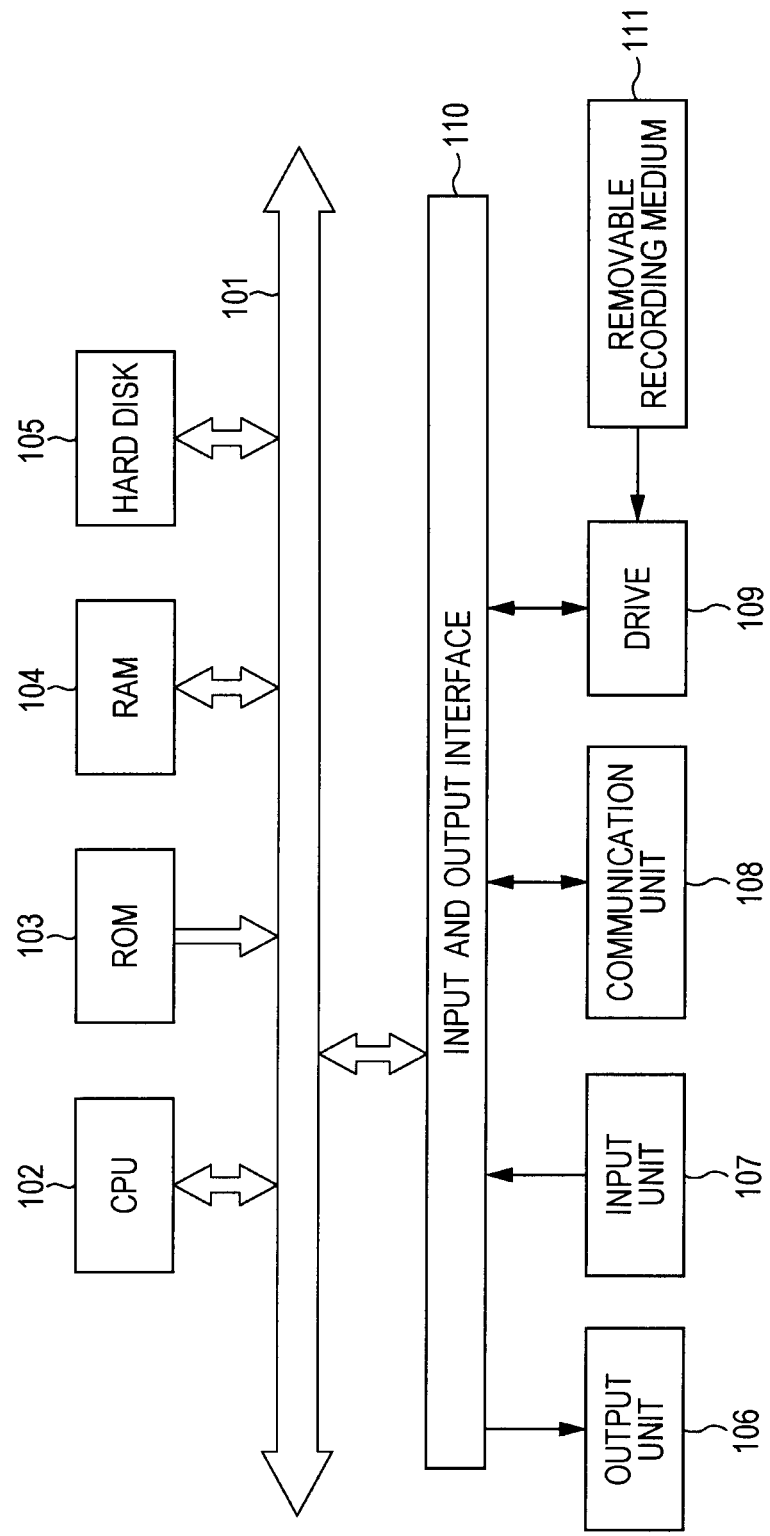
FIG. 19 is a block diagram showing a configuration example of an embodiment of a computer to which the present disclosure is applied.

Thus, FIG. 19 shows a configuration example of an embodiment of a computer in which a program executing the above-described series of process is installed.

The program can be recorded in advance on a hard disk 105 or a ROM 103 as a recording medium included in the computer.

Alternatively, the program can be stored (recorded) in advance on a removable recording medium 111. Such a removable recording medium 111 can be provided as a so-called package software. Herein, as the removable recording medium 111, for example, there are a flexible disk, a CD-ROM (Compact Disc Read Only Memory), an MO (Magneto Optical) disc, a DVD (Digital Versatile Disc), a magnetic disk, a semiconductor memory, and the like.

Furthermore, the program can be installed in the included hard disk 105 by being downloaded onto the computer through a communication network of a broadcasting network, in addition to being installed in the computer from the removable recording medium 111 as described above. In other words, the program can be transmitted to the computer in a wireless manner through, for example, a satellite for digital satellite broadcasting from a downloading site, or can be transmitted to the computer in a wired manner through a network such as a LAN (Local Area Network), or the Internet.

The computer includes a CPU (Central Processing Unit) 102, and the CPU 102 is connected to an input and output interface 110 through a bus 101.

When a user inputs a command through the input and output interface 110 by operating an input unit 107, or the like, the CPU 102 executes the program stored in the ROM (Read Only Memory) 103 according to the command. Alternatively, the CPU 102 executes the program stored in the hard disk 105 after loading the program on the RAM (Random Access Memory) 104.

Accordingly, the CPU 102 performs a process according to the above-described flowcharts, or a process implemented based on the configuration of the block diagrams described above. In addition, the CPU 102 causes an output unit 106 to output, a communication unit 108 to transmit, and the hard disk 105 to record the processing result if necessary through, for example, the input and output interface 110.

Furthermore, the input unit 107 includes a keyboard, a mouse, a microphone, and the like. In addition, the output unit 106 includes an LCD (Liquid Crystal Display), a speaker, and the like.

Herein, in the present specification, it is not necessary to perform a process that the computer performs in accordance with the program in time-series following the order described in the flowcharts. In other words, the process that the computer performs in accordance with the program also includes a process executed in parallel or individually (for example, a parallel process or an object-oriented process).

In addition, the program may perform processing by one computer (processor), or by a plurality of computers in a distributed manner. Furthermore, the program may be transmitted to a remote computer in order to be executed.

Furthermore, the embodiments of the present disclosure are not limited thereto, and can be variously modified within a scope not departing from the gist of the present disclosure.

In other words, as an agent, it is possible to employ a virtual character such as a character in a computer game, in addition to a robot in the physical world.

In addition, the camera 1 (of FIG. 11) does not necessarily have to be mounted on the agent.

Furthermore, the present disclosure can also adopt the following configurations.

[1] An information processing device including a learning unit that performs, using an action performed by an object and an observation value of an image as learning data, learning of a separation learning model that includes a background model that is a model of the background of the image and one or more foreground model(s) that is a model of a foreground of the image, which can move on the background, in which the background model includes a background appearance model indicating the appearance of the background, and at least one among the one or more foreground model(s) includes a transition probability, with which a state corresponding to the position of the foreground on the background is transitioned by an action performed by the object corresponding to the foreground, for each action, and a foreground appearance model indicating the appearance of the foreground.

[2] The information processing device described in [1], in which the learning unit obtains a value corresponding to the difference between the observation value of the image and an observation value observed in the separation learning model as an observation likelihood with which the observation value of the image is observed in the separation learning model, obtains a forward probability and a backward probability using the observation likelihood and the transition probability, updates the transition probability using the forward probability, the backward probability, and the observation likelihood according to a Baum-Welch algorithm, and updates the foreground appearance model and the background appearance model using the observation value of the image, uses an observation value of an area in a foreground size determined in advance at a position corresponding to the state among observation values of the image in updating the foreground appearance model, and uses the observation value of the image obtained by setting the observation value of the area in the foreground size to 0 at the position corresponding to the state in updating the background appearance model.

[3] The information processing device described in [2], in which the separation learning model includes a plurality of foreground models, and the learning unit sequentially selects the plurality of foreground models in a target model to be learned and updates the transition probability and the foreground appearance model of the target model, and then updates the background appearance model.

[4] The information processing device described in [3], in which the learning unit performs a reduction process for reducing an observation value from the observation value of the image by an amount used in updating of the foreground appearance model of the target model, and performs updating of the next target model using the observation value of the image that has undergone the reduction process.

[5] The information processing device described in [3] or [4], in which, as the plurality of foreground models, a foreground model with an action condition having a transition probability for each action and the foreground appearance model and a foreground model without an action condition having a transition probability irrelevant to the action and the foreground appearance model are mixed, and the learning unit preferentially selects the foreground model with an action condition to the foreground model without an action condition in the target model, updates, using the observation value of the image, an assumption model assuming that the foreground appearance model of the plurality of foreground models is respectively employed as the foreground appearance model of the foreground model with an action condition selected in the target model, obtains the observation likelihood using an assumption model of which an entropy of the transition probability is the minimum in the assumption model after updating, and updates the transition probability and the foreground appearance model of the target model using the observation likelihood.

[6] The information processing device described in any one of [2] to [5], in which, the observation value of the image is an observation value of a visual field area of a known visual field in the image, and the learning unit performs updating of the transition probability of the foreground model only for the transition probability from the state in which the entire area in the foreground size is included in the visual field area, and performs updating of the foreground appearance model of the foreground model and the background appearance model of the background model using the forward probability and the backward probability for the state in which the entire area in the foreground size is included in the visual field area.

[7] The information processing device described in any one of [1] to [6], in which the learning unit performs incremental learning of the separation learning model in such a way that the separation learning model is learned by performing updating computation for updating the transition probability, the foreground appearance model, and the background appearance model as parameters of the separation learning model using the learning data, an intermediate result of the updating computation is stored, and updating computation for updating the parameters of the separation learning model is performed using the next learning data and the intermediate result of the updating computation.

[8] An information processing method including a step of performing learning of a separation learning model using an action performed by an object and an observation value of an image as learning data, the model including a background model that is a model of the background of the image and one or more foreground model(s) that is a model of a foreground of the image, which can move on the background, in which the background model includes a background appearance model indicating the appearance of the background, and at least one among the one or more foreground model(s) includes a transition probability, with which a state corresponding to the position of the foreground on the background is transitioned by an action performed by the object corresponding to the foreground, for each action, and a foreground appearance model indicating the appearance of the foreground.

[9] A program that causes a computer to function as a learning unit that performs learning of a separation learning model using an action performed by an object and an observation value of an image as learning data, the model including a background model that is a model of the background of the image and one or more foreground model(s) that is a model of a foreground of the image, which can move on the background, in which the background model includes a background appearance model indicating the appearance of the background, and at least one among the one or more foreground model(s) includes a transition probability, with which a state corresponding to the position of the foreground on the background is transitioned by an action performed by the object corresponding to the foreground, for each action, and a foreground appearance model indicating the appearance of the foreground.

The present disclosure contains subject matter related to that disclosed in Japanese Priority Patent Application JP 2011-077697 filed in the Japan Patent Office on Mar. 31, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing device comprising:
  a learning unit that performs, using an action performed by an object and an observation value of an image as learning data, learning of a separation learning model, the separation leaning model including:
    a background model that is a model of the background of the image; and one or more foreground models that are models of a foreground of the image, which can move on the background, wherein the background model includes a background appearance model indicating the appearance of the background, wherein at least one among the one or more foreground models includes:

a transition probability, with which a state corresponding to the position of the foreground on the background is transitioned by an action performed by the object corresponding to the foreground, for each action; and a foreground appearance model indicating the appearance of the foreground, wherein the learning unit:

obtains a value corresponding to the difference between the observation value of the image and an observation value observed in the separation learning model as an observation likelihood with which the observation value of the image is observed in the separation learning model;

obtains a forward probability and a backward probability using the observation likelihood and the transition probability;

updates the transition probability using the forward probability, the backward probability, and the observation likelihood according to a Baum-Welch algorithm, and updates the foreground appearance model and the background appearance model using the observation value of the image;

uses an observation value of an area in a foreground size determined in advance at a position corresponding to the state among observation values of the image in updating the foreground appearance model; and uses the observation value of the image obtained by setting the observation value of the area in the foreground size to 0 at the position corresponding to the state in updating the background appearance model, and wherein the learning unit is implemented via at least one processor.

2. The information processing device according to claim 1, wherein the separation learning model includes a plurality of foreground models, and wherein the learning unit:

sequentially selects the plurality of foreground models in a target model to be learned and updates the transition probability and the foreground appearance model of the target model; and then updates the background appearance model.

3. The information processing device according to claim 2, wherein the learning unit:

performs a reduction process for reducing an observation value from the observation value of the image by an amount used in updating of the foreground appearance model of the target model; and performs updating of the next target model using the observation value of the image that has undergone the reduction process.

4. The information processing device according to claim 3, wherein, as the plurality of foreground models, a foreground model with an action condition having a transition probability for each action and the foreground appearance model; and a foreground model without an action condition having a transition probability irrelevant to the action and the foreground appearance model are mixed, and wherein the learning unit:

preferentially selects the foreground model with an action condition to the foreground model without an action condition in the target model;

updates, using the observation value of the image, an assumption model assuming that the foreground appearance model of the plurality of foreground models is respectively employed as the foreground appearance model of the foreground model with an action condition selected in the target model;

obtains the observation likelihood using an assumption model of which an entropy of the transition probability is the minimum in the assumption model after updating; and updates the transition probability and the foreground appearance model of the target model using the observation likelihood.

5. The information processing device according to claim 1, wherein the observation value of the image is an observation value of a visual field area of a known visual field in the image, and wherein the learning unit:

performs updating of the transition probability of the foreground model only for the transition probability from the state in which the entire area in the foreground size is included in the visual field area; and performs updating of the foreground appearance model of the foreground model and the background appearance model of the background model using the forward probability and the backward probability for the state in which the entire area in the foreground size is included in the visual field area.

6. The information processing device according to claim 1, wherein the learning unit performs incremental learning of the separation learning model in such a way that:

the separation learning model is learned by performing updating computation for updating the transition probability, the foreground appearance model, and the background appearance model as parameters of the separation learning model using the learning data;

an intermediate result of the updating computation is stored; and updating computation for updating the parameters of the separation learning model is performed using the next learning data and the intermediate result of the updating computation.

7. An information processing method, executed by at least one processor of a computing device, the method comprising:

performing learning of a separation learning model using an action performed by an object and an observation value of an image as learning data, the separation learning model including:

a background model that is a model of the background of the image; and one or more foreground models that are models of a foreground of the image, which can move on the background, wherein the background model includes a background appearance model indicating the appearance of the background, wherein at least one among the one or more foreground models includes:

a transition probability, with which a state corresponding to the position of the foreground on the background is transitioned by an action performed by the object corresponding to the foreground, for each action; and
a foreground appearance model indicating the appearance of the foreground, and
wherein the learning comprises:
obtaining a value corresponding to the difference between the observation value of the image and an observation value observed in the separation learning model as an observation likelihood with which the observation value of the image is observed in the separation learning model;
obtaining a forward probability and a backward probability using the observation likelihood and the transition probability;
updating the transition probability using the forward probability, the backward probability, and the observation likelihood according to a Baum-Welch algorithm, and updating the foreground appearance model and the background appearance model using the observation value of the image;
using an observation value of an area in a foreground size determined in advance at a position corresponding to the state among observation values of the image in updating the foreground appearance model; and
using the observation value of the image obtained by setting the observation value of the area in the foreground size to 0 at the position corresponding to the state in updating the background appearance model.

8. A non-transitory computer-readable medium having embodied thereon a program, which when executed by a computer causes the computer to execute an information processing method, the method comprising:
performing learning of a separation learning model using an action performed by an object and an observation value of an image as learning data, the separation learning model including:
a background model that is a model of the background of the image; and
one or more foreground models that are models of a foreground of the image, which can move on the background,
wherein the background model includes a background appearance model indicating the appearance of the background,
wherein at least one among the one or more foreground models includes:
a transition probability, with which a state corresponding to the position of the foreground on the background is transitioned by an action performed by the object corresponding to the foreground, for each action; and
a foreground appearance model indicating the appearance of the foreground, and
wherein the learning comprises:
obtaining a value corresponding to the difference between the observation value of the image and an observation value observed in the separation learning model as an observation likelihood with which the observation value of the image is observed in the separation learning model;
obtaining a forward probability and a backward probability using the observation likelihood and the transition probability;
updating the transition probability using the forward probability, the backward probability, and the observation likelihood according to a Baum-Welch algorithm, and updating the foreground appearance model and the background appearance model using the observation value of the image;
using an observation value of an area in a foreground size determined in advance at a position corresponding to the state among observation values of the image in updating the foreground appearance model; and
using the observation value of the image obtained by setting the observation value of the area in the foreground size to 0 at the position corresponding to the state in updating the background appearance model.

9. The information processing method according to claim 7,
wherein the separation learning model includes a plurality of foreground models, and
wherein the learning further comprises:
sequentially selecting the plurality of foreground models in a target model to be learned and updating the transition probability and the foreground appearance model of the target model; and then
updating the background appearance model.

10. The information processing device according to claim 9,
wherein the learning further comprises:
performing a reduction process for reducing an observation value from the observation value of the image by an amount used in updating of the foreground appearance model of the target model; and
performing updating of the next target model using the observation value of the image that has undergone the reduction process.

11. The information processing device according to claim 10,
wherein, as the plurality of foreground models,
a foreground model with an action condition having a transition probability for each action and the foreground appearance model; and
a foreground model without an action condition having a transition probability irrelevant to the action and the foreground appearance model are mixed, and
wherein the learning further comprises:
preferentially selecting the foreground model with an action condition to the foreground model without an action condition in the target model;
updating, using the observation value of the image, an assumption model assuming that the foreground appearance model of the plurality of foreground models is respectively employed as the foreground appearance model of the foreground model with an action condition selected in the target model;
obtaining the observation likelihood using an assumption model of which an entropy of the transition probability is the minimum in the assumption model after updating; and
updating the transition probability and the foreground appearance model of the target model using the observation likelihood.

12. The information processing device according to claim 7,
wherein the observation value of the image is an observation value of a visual field area of a known visual field in the image, and
wherein the learning further comprises:
performing updating of the transition probability of the foreground model only for the transition probability from the state in which the entire area in the foreground size is included in the visual field area; and performing updating of the foreground appearance model of the foreground model and the background appearance model of the background model using the forward probability and the backward probability for the state in which the entire area in the foreground size is included in the visual field area.

13. The information processing device according to claim 7, wherein the learning further comprises performing incremental learning of the separation learning model in such a way that:
the separation learning model is learned by performing updating computation for updating the transition probability, the foreground appearance model, and the background appearance model as parameters of the separation learning model using the learning data;
an intermediate result of the updating computation is stored; and
updating computation for updating the parameters of the separation learning model is performed using the next learning data and the intermediate result of the updating computation.

14. The non-transitory computer-readable medium according to claim 8,
wherein the separation learning model includes a plurality of foreground models, and
wherein the learning further comprises:
sequentially selecting the plurality of foreground models in a target model to be learned and updating the transition probability and the foreground appearance model of the target model; and then
updating the background appearance model.

15. The non-transitory computer-readable medium according to claim 14,
wherein the learning further comprises:
performing a reduction process for reducing an observation value from the observation value of the image by an amount used in updating of the foreground appearance model of the target model; and
performing updating of the next target model using the observation value of the image that has undergone the reduction process.

16. The non-transitory computer-readable medium according to claim 15,
wherein, as the plurality of foreground models,
a foreground model with an action condition having a transition probability for each action and the foreground appearance model; and
a foreground model without an action condition having a transition probability irrelevant to the action and the foreground appearance model are mixed, and wherein the learning further comprises:
preferentially selecting the foreground model with an action condition to the foreground model without an action condition in the target model;
updating, using the observation value of the image, an assumption model assuming that the foreground appearance model of the plurality of foreground models is respectively employed as the foreground appearance model of the foreground model with an action condition selected in the target model;
obtaining the observation likelihood using an assumption model of which an entropy of the transition probability is the minimum in the assumption model after updating; and
updating the transition probability and the foreground appearance model of the target model using the observation likelihood.

17. The non-transitory computer-readable medium according to claim 8,
wherein the observation value of the image is an observation value of a visual field area of a known visual field in the image, and
wherein the learning further comprises:
performing updating of the transition probability of the foreground model only for the transition probability from the state in which the entire area in the foreground size is included in the visual field area; and
performing updating of the foreground appearance model of the foreground model and the background appearance model of the background model using the forward probability and the backward probability for the state in which the entire area in the foreground size is included in the visual field area.

18. The non-transitory computer-readable medium according to claim 8, wherein the learning further comprises performing incremental learning of the separation learning model in such a way that:
the separation learning model is learned by performing updating computation for updating the transition probability, the foreground appearance model, and the background appearance model as parameters of the separation learning model using the learning data;
an intermediate result of the updating computation is stored; and
updating computation for updating the parameters of the separation learning model is performed using the next learning data and the intermediate result of the updating computation.

* * * * *